US012264645B1

(12) United States Patent
Speetjens et al.

(10) Patent No.: US 12,264,645 B1
(45) Date of Patent: Apr. 1, 2025

(54) ENERGY CAPTURE DEVICE AND SYSTEM

(71) Applicants: Kenneth Dale Speetjens, Mobile, AL (US); Angela Dobson Speetjens, Mobile, AL (US)

(72) Inventors: Kenneth Dale Speetjens, Mobile, AL (US); Angela Dobson Speetjens, Mobile, AL (US)

( * ) Notice: Subject to any disclaimer, the term of this patent is extended or adjusted under 35 U.S.C. 154(b) by 233 days.

(21) Appl. No.: 17/948,859

(22) Filed: Sep. 20, 2022

Related U.S. Application Data

(62) Division of application No. 16/401,617, filed on May 2, 2019, now Pat. No. 11,477,951.

(60) Provisional application No. 62/666,077, filed on May 2, 2018.

(51) Int. Cl.
 *F03B 7/00* (2006.01)
 *A01G 31/00* (2018.01)

(52) U.S. Cl.
 CPC .......... *F03B 7/00* (2013.01); *A01G 2031/006* (2013.01); *F05B 2210/11* (2013.01); *F05B 2220/706* (2013.01)

(58) Field of Classification Search
 CPC .. F03B 7/00; A01G 2031/006; F05B 2210/11; F05B 2220/706
 See application file for complete search history.

(56) References Cited

U.S. PATENT DOCUMENTS

| 4,488,055 A | * | 12/1984 | Toyama | F03B 13/08 416/185 |
| 6,051,892 A | * | 4/2000 | Toal, Sr. | F03B 17/005 290/43 |
| 2009/0058092 A1 | * | 3/2009 | Chen | F03B 17/005 290/54 |
| 2012/0031518 A1 | * | 2/2012 | Smith | F03B 13/00 138/108 |

FOREIGN PATENT DOCUMENTS

KR 20140062753 A * 5/2014

* cited by examiner

Primary Examiner — Julio C. Gonzalez
(74) Attorney, Agent, or Firm — AdamsIP, LLC

(57) ABSTRACT

A hydroponic container growing system is provided. The growing system provides a closed growing environment providing climate and other growing conditions suitable for year-round plant production. The growing system may include a container having a plurality of subsystems therein. The plurality of subsystems may include a plant production system, an environmental regulation system, an energy capture system, a control system, and a dosage system. The plant production system may include an Ebb and Flow irrigation system and one or more Nutrient Film Technique (NFT) irrigation systems. A single reservoir may supply the Ebb and Flow irrigation system and a NFT irrigation system to provide a dual technique, single nutrient supply source irrigation system for plant production. An energy capture system which utilizes the kinetic energy of flowing liquid to generate electrical energy may be integrated into one or more irrigation systems within the plant production system.

9 Claims, 15 Drawing Sheets

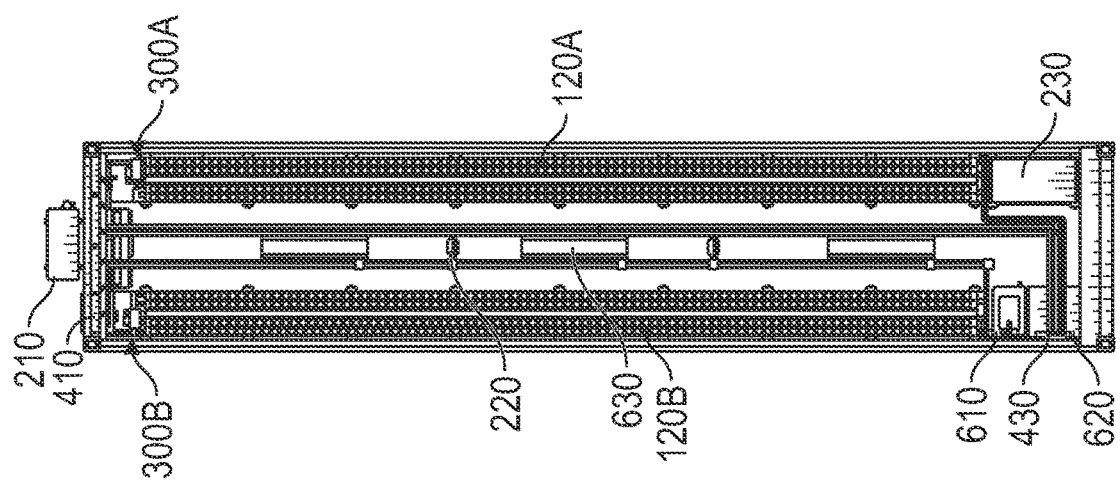
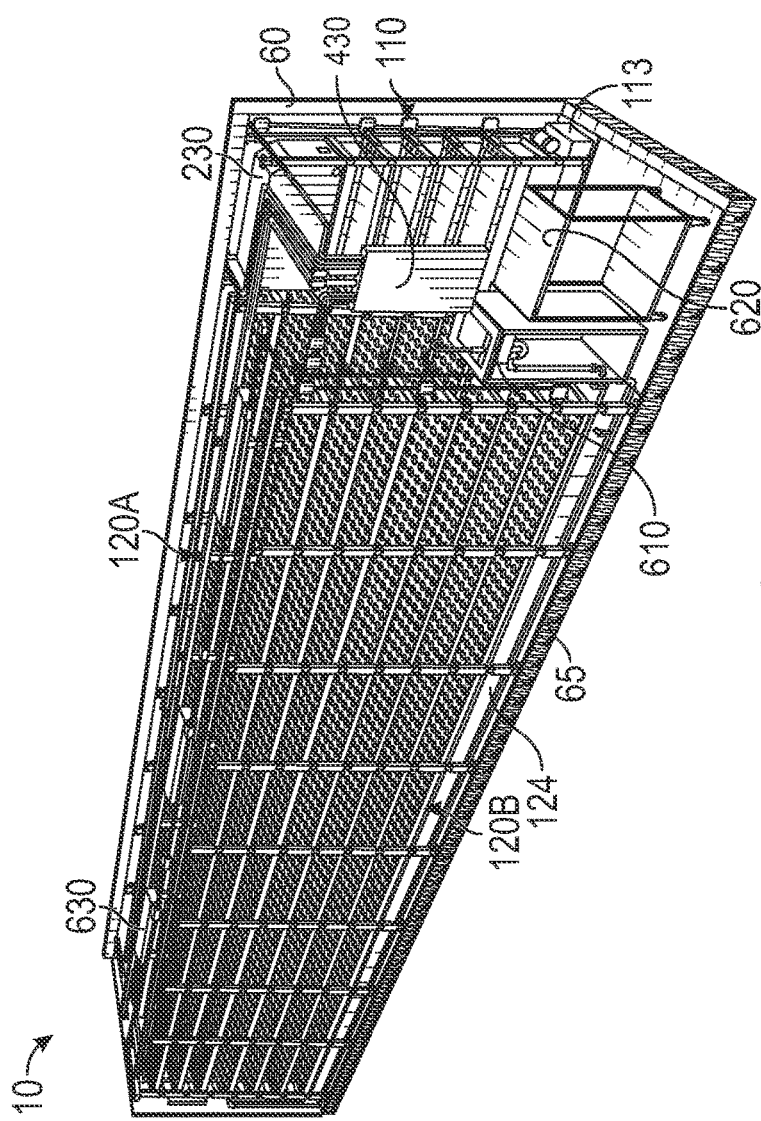
FIG. 4
FIG. 3

ENERGY CAPTURE DEVICE AND SYSTEM

CROSS-REFERENCE TO RELATED APPLICATIONS

This application is a divisional of U.S. patent application Ser. No. 16/401,617, entitled "ENERGY CAPTURE DEVICE AND SYSTEM", filed on May 2, 2019, which claims priority to U.S. Provisional Patent Application Ser. No. 62/666,077, entitled "HYDROPONIC CONTAINER GROWING SYSTEM", filed on May 2, 2018, the entirety of which applications are incorporated herein by reference.

FIELD OF THE DISCLOSURE

The subject matter of the present disclosure relates generally to an energy capture device and system. The device and system may be utilized with a hydroponic irrigation system to generate electrical energy.

BACKGROUND

As the population continues to increase and climate conditions continue to fluctuate and change, meeting communities' fresh produce needs is becoming increasingly more difficult with respect to both plant production and delivery. Traditional commercial farming techniques generally require the cultivation and care of large tracts of outdoor land in which crops are planted and remain until harvest. As such, the crops are subjected to the environmental conditions experienced within the area in which the tract of land is located. Accordingly, adverse weather conditions in the short term and shifts in a geographic area's climate in the long term can significantly reduce or eliminate crop yield. Moreover, the general climate conditions and/or spatial land constraints of a geographic region may render commercial plant production effectuated through traditional farming techniques impractical or impossible. Rather, for communities in such regions to acquire produce, produce must be imported from areas more environmentally or spatially hospitable to traditional farming methods, which often necessitates the transport of produce across hundreds or thousands of miles from source to consumer. The transportation of produce over such distances not only reduces the effective shelf life of the produce but also increases consumer cost. Additionally, the use of traditional commercial farming techniques for plant production often results in increased pesticide and/or herbicide levels, water consumption, and soil degradation in the area in which the farming tract is located. Thus, as made evident by the above, the use of traditional commercial farming techniques as a primary method of plant production is becoming less and less viable.

New apparatuses, systems, and methods that serve to cure the deficiencies consistent with traditional commercial farming techniques and that provide for improved plant production are described herein.

SUMMARY

In one aspect, a hydroponic container growing system is provided. The growing system is generally designed to provide an enclosed growing environment with climate and growing conditions suitable for year-round plant production. The growing system generally includes an enclosed container in which one or more subsystems are housed. In some embodiments, the one or more subsystems may include a plant production system, an environmental regulation system, a dosage system, and a control system.

The plant production system is configured to foster plant growth and, in an embodiment, may include at least one of an Ebb and Flow irrigation system and one or more Nutrient Film Technique (NFT) irrigation systems, each irrigation system having, and being configured to deliver nutrient solution to, one or more plant containment areas adapted to hold a plurality of plants. The environmental regulation system is designed to promote plant growth by regulating the climate and measuring certain environmental conditions within the container. To regulate climatic conditions within the container, the environmental regulation system may include a heating ventilation and air conditioning (HVAC) system configured to regulate the interior temperature of the container, one or more fans configured to circulate air throughout the container, and a dehumidifier configured to adjust humidity levels within the container. To measure certain environmental conditions within the container and experienced by plant life contained therein, the environmental regulation system may include environmental and nutrient solution sensors.

The dosage system is configured to supply nutrient solution to each irrigation system within the plant production system by drawing solution from one or more supply tanks and subsequently directing the solution to the irrigation systems. The control system is configured to control action of certain components of the growing system and may include a controller operably connected to at least one of the plant production system, the environmental regulation system, and the dosage system to control one or more components of the respective subsystems. For instance, in some embodiments, the controller may be configured to direct the dosage system to administer defined amounts of solution from the one or more nutrient solution supply tanks to one or more of the irrigation systems within the plant production system based on the readings of the nutrient solution sensors within environmental regulation system. The controller may include an interface which allows users to pre-program or direct the controller to carry out predefined operations which may cause some or all of the subsystem components operably connected to the control to perform certain actions.

In an embodiment, the growing system may further include an energy capture system which utilizes the kinetic energy of flowing liquid of one or more of the irrigation systems within the plant production system to generate electrical energy. The energy capture system is defined by one or more or more energy capture subsystems, wherein each energy capture subsystem includes one or more energy capture devices. Each energy capture device is configured to generate electrical energy as liquid flows through the energy capture device. In some embodiments, each energy capture device may include a housing, an alternator having a rotatable crankshaft, and a water wheel operably secured to the crankshaft. In one embodiment, the housing of the energy capture device may include a conduit which defines a flow direction and which includes an inlet and an outlet facilitating passage of liquid through an interior of the energy capture device. In such embodiments, the water wheel may be oriented relative to the conduit of the housing so that passage of liquid through the conduit of the housing causes the water wheel to rotate which, in turn, drives rotation of the alternator's crankshaft causing the alternator to generate electrical energy.

In an embodiment, each energy capture subsystem includes a plurality of vertically arranged energy capture devices adapted to be fluidly connected to an output of an irrigation system within the plant production system. In one such embodiment, the conduit of each energy capture device within an energy capture subsystem may be linearly arranged with the conduits of the other energy capture devices within the energy capture subsystem so liquid flowing from at least one plant containment area of an irrigation system within the plant production system passes through multiple energy capture devices. In such embodiments, the electrical wattage outputted by each successive energy capture device may increase as the energy capture subsystem extends from the uppermost positioned energy capture device to the lowermost energy capture device. Accordingly, in another aspect, the present disclosure is directed to a system for generating electrical energy comprising a hydroponic irrigation system configured to deliver nutrient solution to a plurality of plants and having at least one plant containment area for holding a plurality of plants and at least one energy capture device fluidly connected to the irrigation system. In some embodiments, the irrigation system may include a reservoir adapted to hold nutrient solution for use within the irrigation system and the at least one energy capture device may be fluidly connected downstream of the at least one plant containment area and upstream of the reservoir.

In an embodiment, the plant production system may be defined by a first NFT irrigation system, a second NFT irrigation system, and an Ebb and Flow irrigation system. In an embodiment, the first NFT irrigation system and the Ebb and Flow system may draw nutrient solution from a single reservoir. Accordingly, in another aspect, the present disclosure is directed toward a dual technique, single source irrigation system for plant production. The growing system of the present disclosure may be utilized to foster the growth of a variety of plant life. As such, the present disclosure is further directed toward a method of growing plants using a hydroponic container growing system having the features specified herein.

The foregoing summary has outlined some features of the device, system, and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the apparatus, system, and methods disclosed herein. Those skilled in the pertinent art should also realize that such equivalent designs or modifications do not depart from the scope of the device, system, and the methods of the present disclosure.

DESCRIPTION OF THE DRAWINGS

These and other features, aspects, and advantages of the present disclosure will become better understood with regard to the following description, appended claims, and accompanying drawings where:

FIG. 3 shows a front perspective of the interior of a growing system having features consistent with the principles of the present disclosure;

FIG. 4 shows a top plan view of the interior of a growing system having features consistent with the principles of the present disclosure;

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "nutrient solution" and grammatical equivalents thereof are used herein to mean a liquid which may be applied to plant life to promote growth.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-16 and 18-19 illustrate certain embodiments of a hydroponic container growing system ("growing system") 10 or components thereof. The growing system 10 generally includes an enclosed container 50 in which one or more subsystems 100-500 are contained. The container 50 provides a physical barrier between the one or more subsystems of the growing system 10 and the outside environment of the location in which the container 50 is located. As such, the container 50 may be any suitable container having dimensions sufficient to encapsulate the one or more subsystems 100-500 of the growing system 10. To facilitate transport of the growing system 10 to and from desired grow sites, the dimensions of the container 50 may be such that the container 50 is transportable by way of boat, train, plane, or automobile without having to deconstruct the container 50. The transportable container 50 design enables the growing system 10 to be transported to and incorporated directly within communities either devoid or lacking sufficient farming operations, thereby reducing the geographic distance between food source and end consumer.

Figure 1:
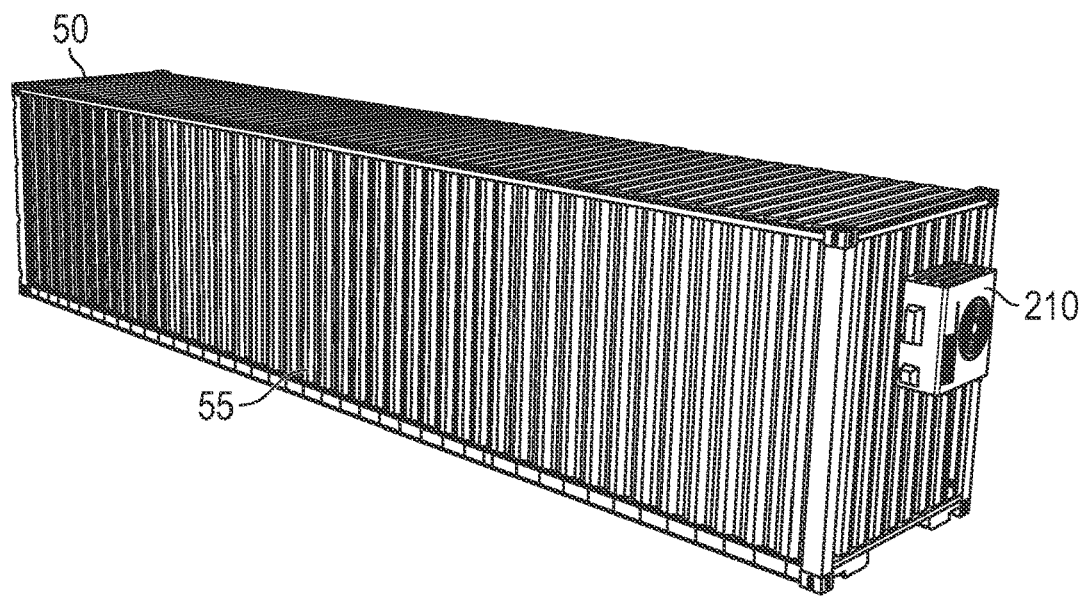
FIG. 1 shows a back perspective view of the exterior of a growing system having features consistent with the principles of the present disclosure.
Figure 5:
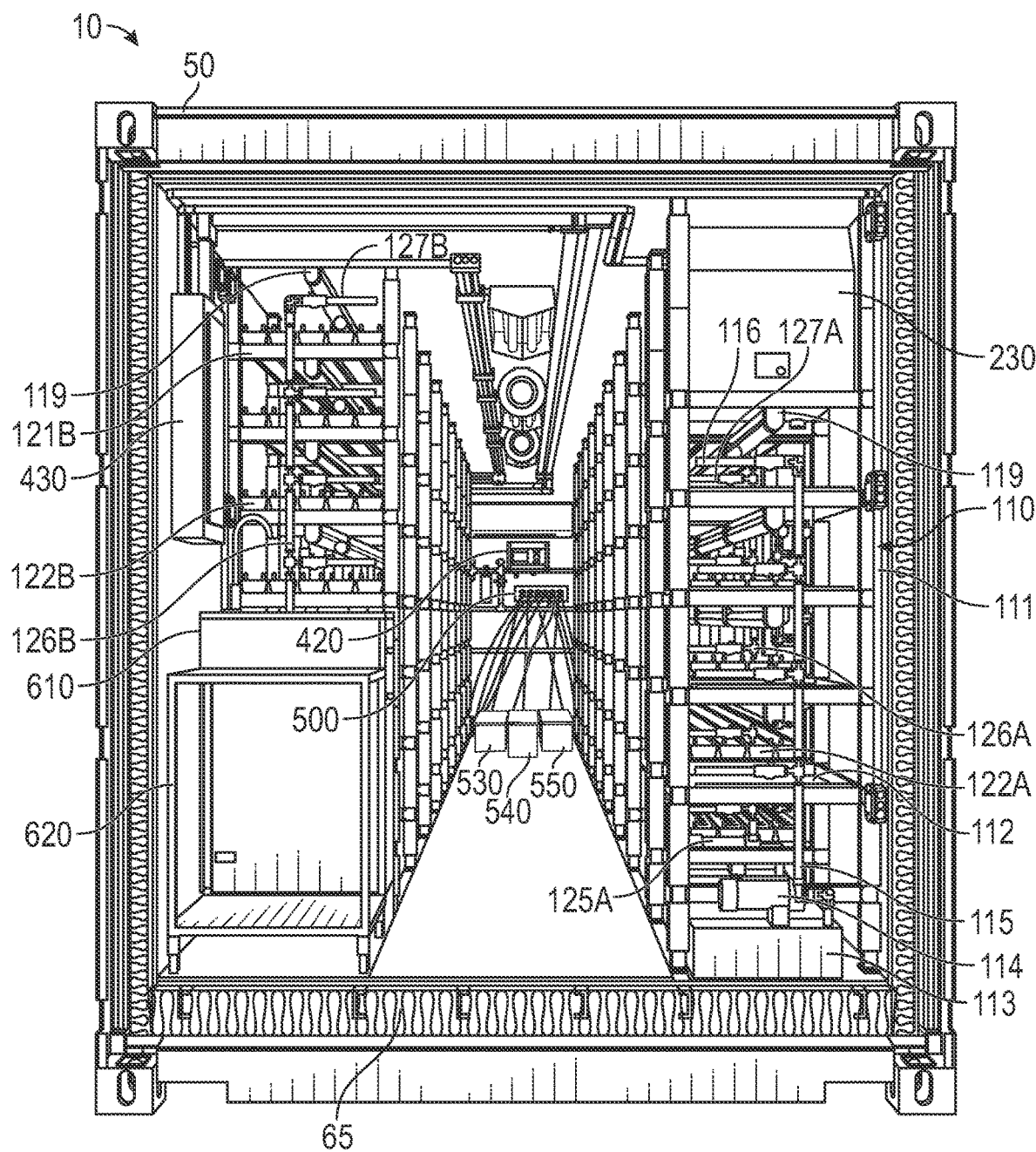
FIG. 5 shows a front view of the interior of a growing system having features consistent with the principles of the present disclosure.

FIG. 1 shows a back perspective view of a container 50 in accordance with one embodiment. As shown in FIG. 1, the container 50 may comprise an elongated freight container. For improved durability and impact resistance, the exterior wall 55 of the container 50 may be constructed, at least partially, of a metal material, though other suitable materials, such as wood, may be utilized without departing from the inventive subject matter of the present disclosure. The container 50 may include insulation 65 disposed between its exterior 55 and interior walls 60 to guard against undesired heat transfer between the container's 50 interior and an outside environment, as best shown in FIG. 5. In some embodiments, the R-value of the insulation within the side walls of the container 50 may vary from the R-value of the insulation within the floor and ceiling of the container 50. For instance, in some embodiments, the insulation within the side walls of the container 50 may have an R-value of 28 while the insulation within the floor and ceiling of the container 50 has an R-value of 35. The container 50 may include at least one door (not shown) for entry into and exit from the container's 50 interior. The container 50 may have one or more openings extending through one or more of its walls in which certain components described herein may be disposed or pass through. For instance, as shown in FIG. 1, the container 50 may include an opening through which an HVAC system 210 extends. In an embodiment, the at least one door may be contained within a container 50 wall that is opposite the container 50 wall in which the HVAC system 210 is disposed. Alternatively, the at least one door and the HVAC system 210 may be disposed within the same or adjacent container 50 walls.

Figure 2:
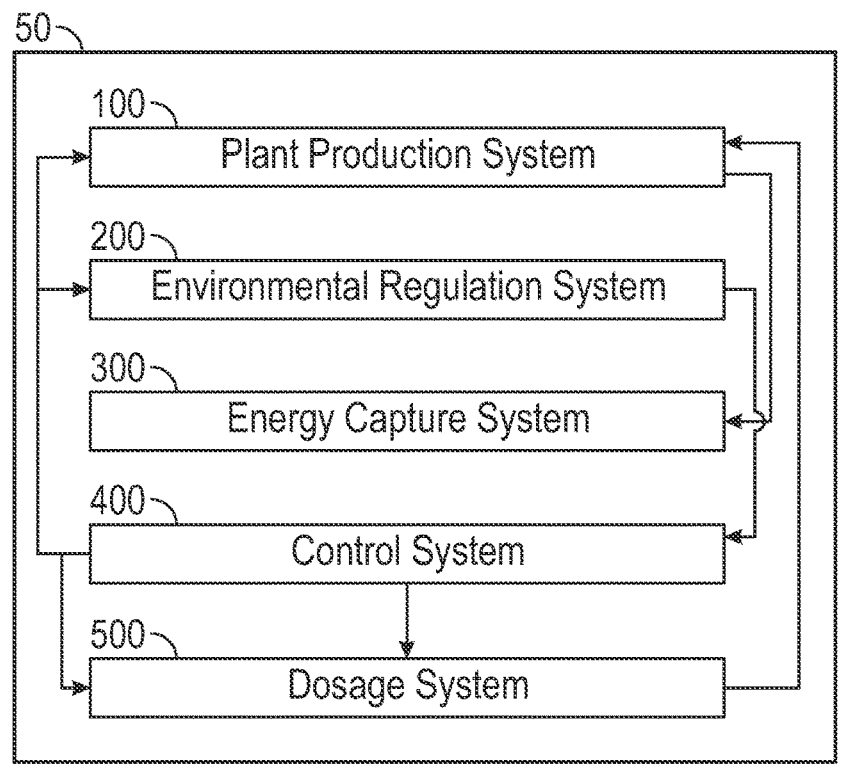
FIG. 2 shows a block diagram of a plurality of subsystems within a growing system having features consistent with the principles of the present disclosure.

As shown in FIG. 2, the one or more subsystems 100-500 housed within the container 50 may include a plant production system 100, an environmental regulation system 200, a control system 400, and/or a dosage system 500. The plant production system 100 may, in some embodiments, include a plurality of hydroponic irrigation systems. Each irrigation system within the plant production system 100 includes one or more plant containment areas 810 in which a plurality of plants may be held and is configured to foster plant growth by supplying nutrient solution to plants disposed within its one or more plant containment areas 810. In an embodiment, two or more irrigation techniques may be utilized within the plurality of irrigation systems within the plant product system 100. In one embodiment, the plurality of irrigation systems defining the plant production system 100 may include an Ebb and Flow irrigation system 110 and at least one NFT irrigation system, as shown best in FIGS. 2-5. As further shown in FIGS. 2-5, in some embodiments, the plant production system 100 may include a first NFT irrigation system 120A and a second NFT irrigation system 120B.

The Ebb and Flow irrigation system 110 is configured to supply nutrient solution to and subsequently drain nutrient solution away from plant matter disposed within the irrigation system in cyclical fashion. As shown best in FIGS. 5-7, the Ebb and Flow irrigation system 110 may include a rack 111, one or more flood trays 112, a reservoir 113, a nutrient solution supply pump 114, an input conduit 115, an output conduit 117, one or more drain valves 118, and one or more grow lights 119. In an embodiment, the Ebb and Flow irrigation system 110 may include a plurality of flood trays 112, as further shown in FIGS. 5-7. In one embodiment, the Ebb and Flow irrigation system 110 may include four flood trays 112, though it is understood that any number of flood trays may be used and still fall within the scope of the present disclosure. Accordingly, in some embodiments, the Ebb and Flow irrigation system 110 may be a multi-tiered irrigation system. Each flood tray 112 of the within the Ebb and Flow irrigation system 110 is supported by and disposed horizontally within the rack 111. In an embodiment, the rack 111 of the Ebb and Flow irrigation system 110 may be vertically adjustable so that the height of one or more flood trays 112 may be selectably adjusted as desired or needed. In one such embodiment, the rack 111 of the Ebb and Flow irrigation system 110 may include a plurality of vertical support members connected by a telescopic connection to facilitate vertical adjustment of the rack 111. In some embodiments, each flood tray 112 may be removably secured to the rack 111. In this way, each respective flood tray 112 may be easily replaced in the event of structural failure or substituted with another flood tray 112 having a different volumetric capacity. Accordingly, the volumetric capacity of each flood tray 112 within the Ebb and Flow irrigation system 110 may be the same or vary. The ability to incorporate flood trays 112 of varying volumetric capacity into and out of the Ebb and Flow irrigation system 110 as needed or desired may enable the Ebb and Flow irrigation system 110 to accommodate and facilitate growth across a broader range of plant life. For instance, to accommodate and facilitate growth and/or cloning for lettuce, herbs, and leafy-green plants, other common food crops, and/or medical plants, a flood tray 112 having a first volumetric capacity may be used while a flood tray 112 having a second volumetric capacity may be used to accommodate and facilitate growth for microgreens and/or other plants. In alternative embodiments, the flood trays 112 may be permanently secured to the rack 111.

The flood trays 112 within the Ebb and Flow irrigation system 110 may be vertically arranged such that flood trays 112 retain a generally stacked configuration where each flood tray 112 is vertically adjacent to at least one other flood tray 112, thereby reducing the surface area occupied by the Ebb and Flow irrigation system 110 within the container 50. The reservoir 113 of the Ebb and Flow irrigation system 110 is configured to store nutrient solution therein and may be any container suitable for doing the same. As shown best in FIGS. 5 and 6, the reservoir 113 may be disposed subjacent to the lowermost flood tray 112 within the Ebb and Flow irrigation system 110. In an embodiment, the reservoir 113 may be disposed on the floor of the container 50. In other embodiments, the reservoir 113 may be positioned at a different location or in a different configuration within the container's 50 interior. The input conduit 115 extends from the reservoir 113 and serves as the conduit through which nutrient solution may be directed from the reservoir 113 into the flood trays 112. The nutrient supply pump 114 is fluidly connected to the reservoir 113 and is configured to pump nutrient solution from the reservoir 113, through the input conduit 115, and into the individual flood trays 112 of the Ebb and Flow irrigation system 110.

Figure 6:
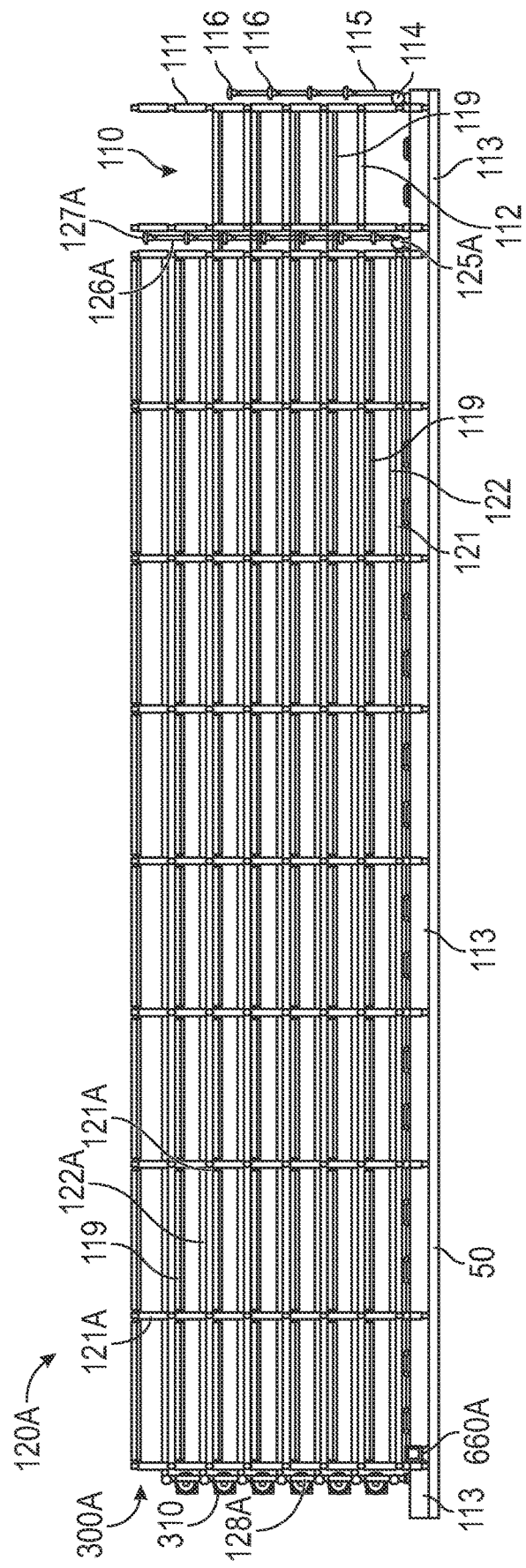
FIG. 6 shows a side view of an irrigation system having features consistent with the principles of the present disclosure.
Figure 7:
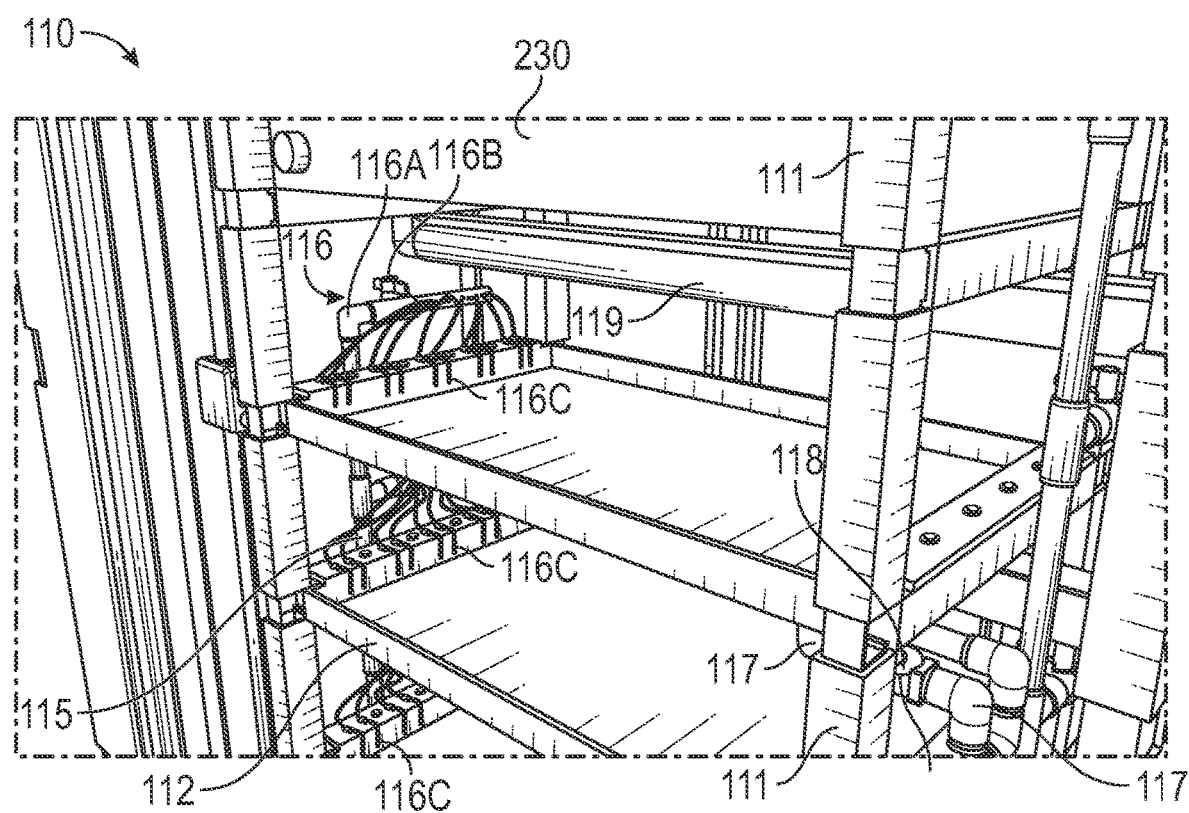
FIG. 7 shows a partial perspective view of an irrigation system having features consistent with the principles of the present disclosure.

As shown best in FIGS. 5-7, the input conduit 115 may have one or more arm assemblies 116 extending therefrom through which nutrient solution pumped through the input conduit must pass prior to reaching a particular flood tray 112. In some embodiments, the number of arm assemblies 116 may be equal to the number of flood trays 112. As shown best in FIG. 7, each arm assembly may include an arm member 116A, a shutoff valve 116B, and one or more output lines 116C extending from the arm member 116A. In an embodiment, the arm member 116A may extend perpendicularly from the input conduit 115 and have a hollow core. The arm member 116A may have one or more openings therein from which the one or more output lines 116 extend to deliver nutrient solution to a designated flood tray 112. The shutoff valve 116B is connected to the arm member 116A between the one or more openings and the end of the arm member 116A connected to the input conduit 115. The shutoff valve 116B may be selectively engaged to either permit nutrient solution to flow from the input conduit 115 through the arm member 116A for delivery to a designated flood tray 112 or to prevent nutrient solution flow through the arm member 116A by blockading the core of the arm member 116A, thereby preventing such delivery. In some embodiments, the shutoff valve 116B may be selectively engaged by rotating a handle in either a first defined direction, e.g., counter-clockwise, to permit nutrient solution flow through the arm member 116A or a second defined direction, e.g., clockwise, to prevent nutrient solution flow through the arm member 116A. In instances where the number of arm assemblies 116 extending from the input conduit 115 is equal to the number of flood trays 112, the arm assemblies may be arranged such that each arm assembly 116 corresponds and is configured to deliver nutrient solution to a single flood tray 112. In such embodiments, users may selectively engage the shutoff valves 116B of the respective arm assemblies 116 to regulate the flow of nutrient solution being supplied to the individual flood trays 112 at any given time. For instance, the shut off valves 116B of each arm assembly 116 may be placed in open configuration such that each flood tray 112 within the Ebb and Flow irrigation system 110 receives the nutrient solution being pumped by the nutrient solution supply pump 114. Conversely, some of the shut off valves 116B may be placed in a closed configuration while others are placed in an open configuration so that only those flood trays 112 having a corresponding arm assembly 116 with its shutoff valve 116B in the open configuration receive the nutrient supply being pumped by the nutrient solution supply pump 114.

The output conduit 117 extends from the underside of each flood tray 112 to the reservoir 113 to permit evacuation of nutrient solution from the respective flood trays 112 back to the reservoir 113. In some embodiments, the output conduit 117 may be positioned generally opposite of the input conduit 115. Evacuation of nutrient solution from each flood tray 112 is regulated by a drain valve 118 interconnected between the flood tray 112 and the output conduit 117. Accordingly, in embodiments where a plurality of flood trays 112 exists, the Ebb and Flow irrigation system 110 includes a plurality of drain valves 118. In an embodiment, the number of drain valves 118 within the Ebb and Flow irrigation system 110 may be equal to the number of flood trays therein. Each drain valve 118 is configured to transition from a closed configuration to an open configuration, or vice versa, to regulate evacuation of the flood trays 112. In a closed configuration, the drain valve 118 acts as blockade between the flood tray 112 to which it corresponds and the output conduit 117 so the flood tray 112 retains the nutrient solution disposed therein. Conversely, when the drain valve 118 is in an open configuration, nutrient solution is permitted to flow from the flood tray 112 to which the open configuration drain valve 118 corresponds into the output conduit 117 for drainage into the reservoir 113.

The transition of each drain valve 118 from a closed configuration to an open configuration, or vice versa, may, in some embodiments, be based on a defined timed schedule. In some embodiments, the timing in which each drain valve 118 transitions from a closed configuration to an open configuration, or vice versa, may be regulated by a controller 420 having some or all of the features disclosed herein that is operably connected to the drain valves 118. Alternatively, individual timers, other time keeping devices, or manually operated valve handles may be operably connected to the drain valves 118 to regulate transition from a closed configuration to an open configuration, or vice versa. In one embodiment, the drain valves 118 may be solenoid valves, though one of skill in the pertinent art will appreciate that other valve types suitable for carrying out the functions of the drain valves 118 disclosed herein may be utilized and still fall within the scope of the present disclosure.

The Ebb and Flow irrigation system includes a grow light 119 secured above each flood tray 112 to provide the lighting necessary for plant growth, as best shown in FIG. 7. In an embodiment, the grow lights 119 within the growing system 10 of the present disclosure may be light-emitting diode (LED) light bars. For instance, in some embodiments, the grow lights 119 may be THRIVE AGRITECH Infinity LED light bars, though it is understood other LED light bars may be utilized without departing from the subject matter of the present disclosure. Each grow light 119 within the growing system 10 is configured to emit artificial light having wavelengths optimal for plant growth. For instance, the grow lights 119 may be configured to emit artificial light having wavelengths within the red and/or blue spectrum of visible light.

Unlike lower intensity string or curtain LED lights that require multiple lighting units to provide the necessary lighting conditions to a designated grow area, such as the area occupied by plants disposed within a flood tray 112 of the Ebb and Flow irrigation system 110, the grow lights 119 utilized within the growing system 10 of the present disclosure may emit light at a greater intensity to minimize the number of light units needed to promote plant growth. For instance, in an embodiment, each grow light 119 may have a light intensity of approximately 30 $\mu$mols/m$^2$/s such that a single grow light 119 alone may be used for and disposed above each flood tray 112 within the Ebb and Flow irrigation system 110 to provide light to the plants disposed therein. In some embodiments, each grow light 119 may be secured to the rack 111 and/or ceiling such that each grow light 119 is approximately eight inches above a flood tray 112. In such embodiments, the beam angle of each grow light 119 may be such that each grow light 119 outputs a beam of light approximately one to two feet in width onto the plants disposed within the flood tray 112 that is positioned below each grow light. However, the above grow light 119 specifications may be adjusted to accommodate other Ebb and Flow irrigation system 110 and NFT irrigation system 120A, 120B designs. As such, one of skill in the art will readily appreciate that the length of the grow lights 119, height at which the grow lights 119 are secured above the flood trays 112, and the beam angles exhibited by the grow lights 119 may vary and still fall within the scope of the present disclosure.

As shown in FIGS. 3-5, 8, and 10, in some embodiments, the plant production system 100 may include one or more NFT irrigation systems 120A, 120B. In one embodiment, the plant production system 100 includes a first NFT irrigation system 120A and a second NFT irrigation system 120B, each configured to provide a shallow stream of nutrient solution to the roots of the plants disposed therein. Each NFT irrigation system 120A, 120B may include a rack 121A, 121B a plurality of channels 122A, 122B a reservoir 113, 124, a nutrient solution supply pump 125A, 125B an input conduit 126A, 126B, an output conduit 128A, 128B, and a plurality of grow lights 119. The rack 121A, 121B of each NFT irrigation system 120A, 120B is configured to support a plurality of channels 122A, 122B in which plants may be disposed and through which nutrient solution may flow and be supplied to such plants. As shown best in FIGS. 6 and 8, the rack 121A, 121B of each NFT irrigation system 120A, 120B may have a plurality of rows. The rows within the respective racks 121A, 121B may be vertically arranged such that the rows retain a stacked configuration where each row is vertically adjacent at least one other row. Each channel 122A, 122B may serve as a conduit in which plants may be disposed and through which nutrient solution may flow from one end of the racks 121A, 121B to the other. As such, the channels 122A, 122B within each NFT irrigation system 120A, 120B may be any container suitable for directing nutrient solution from one end of the rack 121A, 121B to the other. To facilitate nutrient solution flow across the channels 122A, 122B the racks 121 may, in some embodiments, be sufficiently sloped such that gravitational force pulls the nutrient solution within the channels 122A, 122B from one end of the racks 121A, 121B to the other. In some embodiments, the racks 121A, 121B may be arranged or be constructed to retain a slope of approximately 2% to 4%. In an embodiment, the rack 121A, 121B of the first and second NFT irrigation systems 120A, 120B may be vertically adjustable so that the height of one or more rows within the rack 121A, 121B may be selectably adjusted as desired or needed. In one such embodiment, the rack 121A, 121B of the first and second NFT irrigation systems 120A, 120B may include a plurality of vertical support members connected by a telescopic connection to facilitate vertical adjustment of the rack 121A, 121B.

Figure 9:
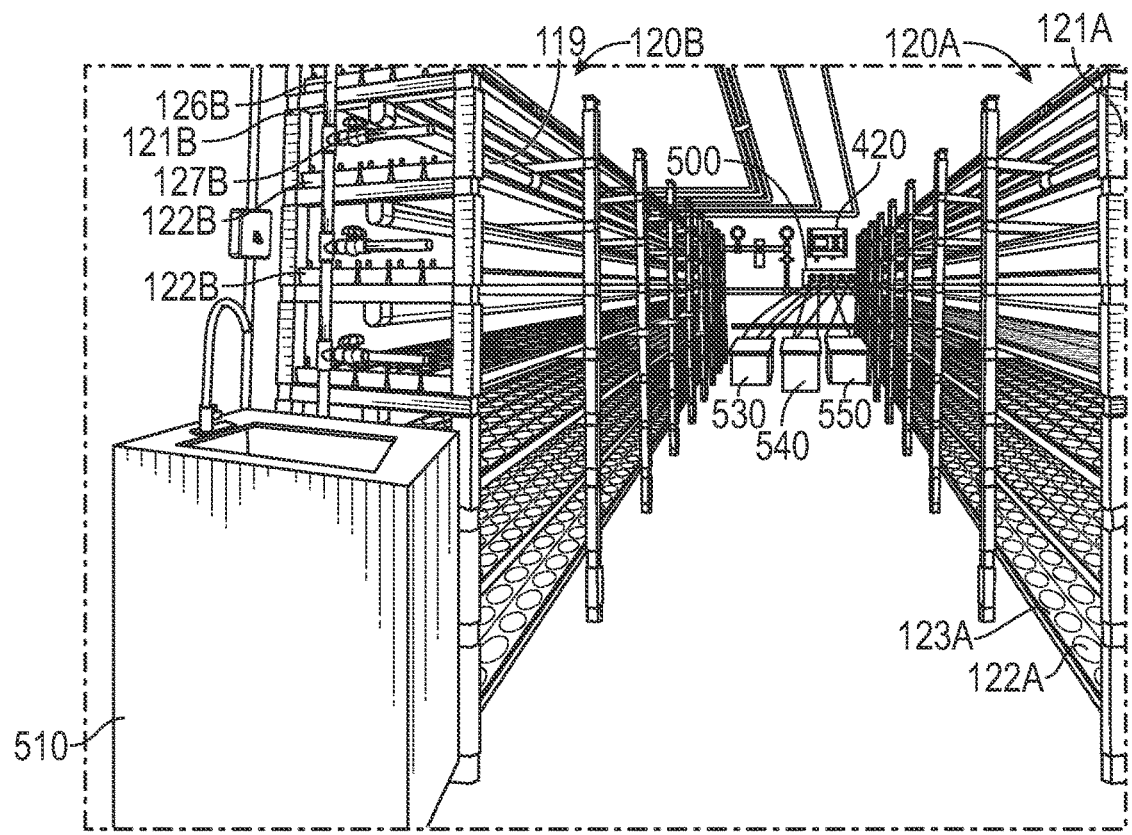
FIG. 9 shows a partial perspective view of the interior of a growing system having features consistent with the principles of the present disclosure.
Figure 10:
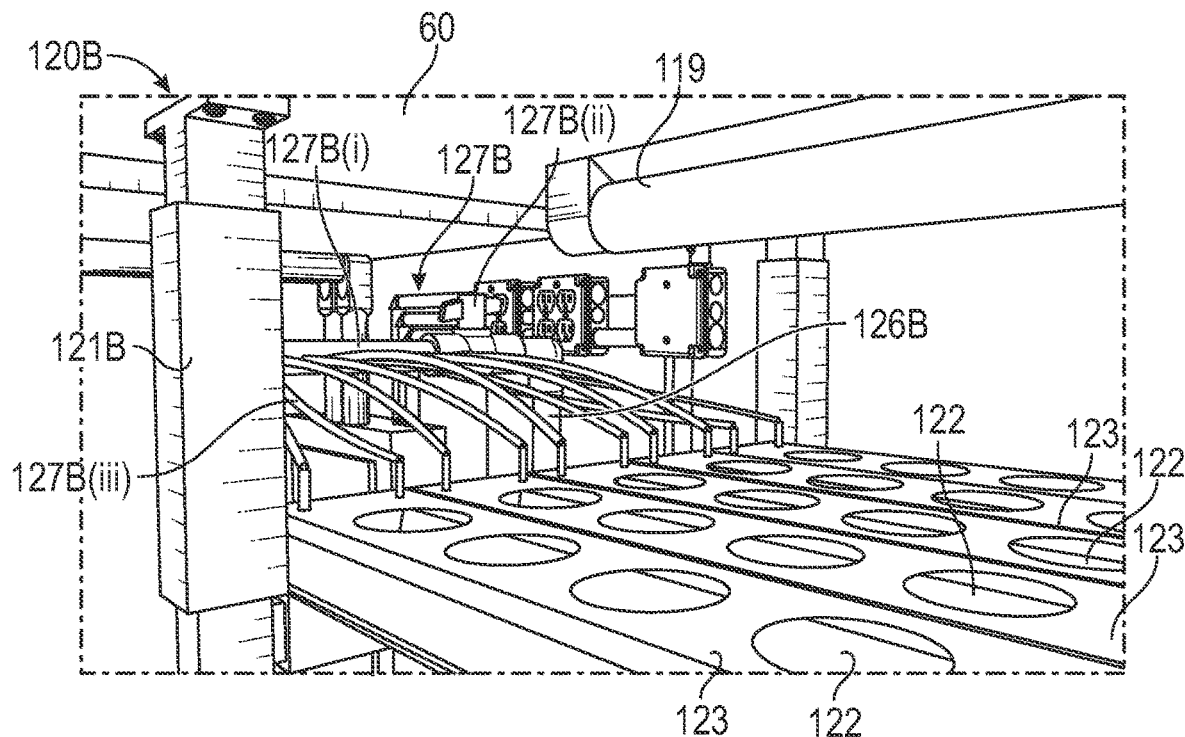
FIG. 10 shows a partial perspective view of an irrigation system having features consistent with the principles of the present disclosure.

To support plants in a generally upright, suspended position within the channels 122A, 122B of the first and second NFT irrigation systems 120A, 120B, each channel 122A, 122B may include a channel cover 123A, 123B having a plurality of openings therein, as shown best in FIG. 9-10. Each opening within the channel covers 123A, 123B is configured to receive a net pot (not shown) in which a plant may be potted. The diameter of each opening within the channel covers 123A, 123B may be such that when a net pot is placed therein the bottom of the net pot is suspended above the lowermost portion of the channel 122A, 122B. In addition to supporting net pots, the channel covers 123A, 123B may also serve to reduce or prevent undesired light from the grow lights 119 or other contaminants from reaching the nutrient solution flowing through the channels 122A, 122B.

In some embodiments, multiple irrigation systems within the plant production system 100 may share and draw nutrient solution from a single reservoir containing nutrient solution. In this way, a single reservoir 113, 124 may fluidly interconnect and supply nutrient solution to multiple irrigation systems within the plant production system 100. In an embodiment, a single reservoir may be shared amongst multiple irrigation systems employing the same irrigation technique, such as the first and second NFT irrigation systems 120A, 120B. In some embodiments, a single reservoir may be shared amongst multiple irrigation systems employing different irrigation techniques. For instance, as shown in FIG. 6, the first NFT irrigation system 120A may share and draw nutrient solution from the same reservoir 113 as the Ebb and Flow irrigation system 110 in one embodiment. The use of a single reservoir 113 to supply both the first NFT irrigation system 120A and the Ebb and Flow irrigation system 110 with nutrient solution may serve to reduce the number of outflow pumps 670, 680, dosage pumps 510, 520, and sets of nutrient solution sensors 244 required in certain embodiments of the growing system 10 disclosed herein. Accordingly, in another aspect, the present disclosure provides a dual technique, single nutrient supply source irrigation system for plant production.

Figure 8:
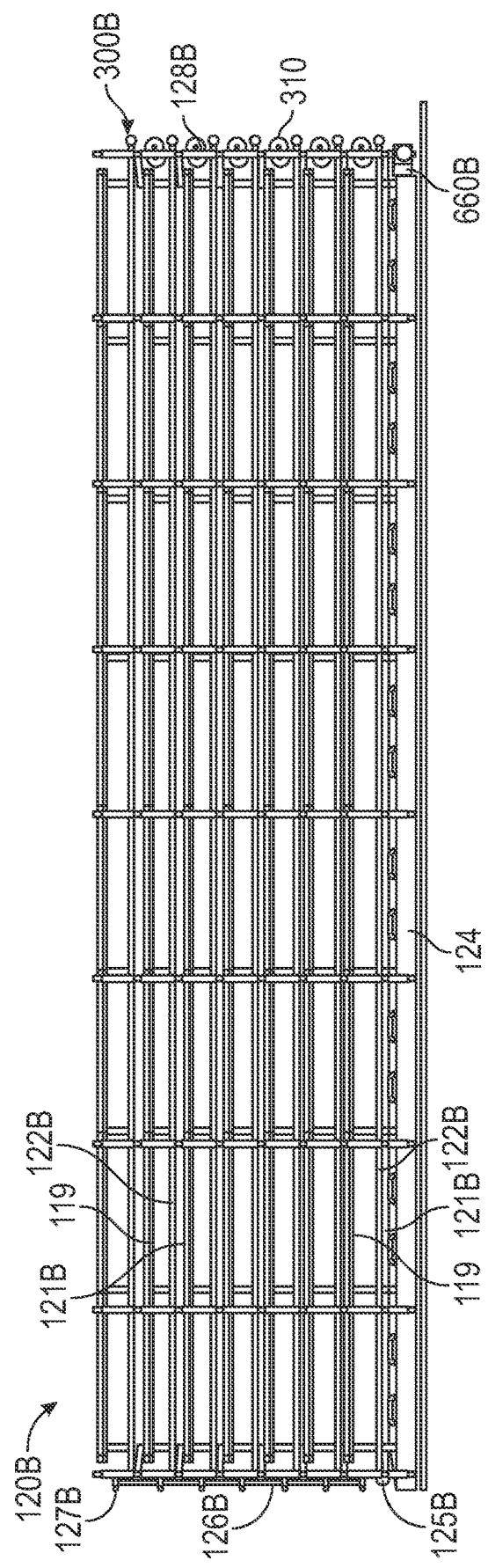
FIG. 8 shows a side view of an irrigation system having features consistent with the principles of the present disclosure.

In an embodiment, the reservoir 113 shared by the first NFT irrigation system 120A and the Ebb and Flow irrigation system 110 may be disposed beneath the lowermost row of the first NFT irrigation system 120A and the lowermost flood tray 112 of the Ebb and Flow irrigation system 110, as shown best in FIGS. 5 and 6. In one such embodiment, the shared reservoir 113 may be disposed on the floor of the container 50. As shown in FIGS. 3-4, in an embodiment, the first NFT irrigation system 120A and the Ebb and Flow irrigation system 110 may be positioned immediately adjacent to one another. In one such embodiment, the combined length of the Ebb and Flow irrigation system 110 and first NFT irrigation system 120A may substantially span the length of the container 50. In an embodiment, the shared reservoir 113 may have a length approximately equal to or greater than the combined length of the racks 121A, 111 of the first NFT irrigation system 120A and the Ebb and flow irrigation system 110, respectively, as shown in FIG. 6. One of skill in the art, however, will appreciate that the length of the shared reservoir 113 may vary or be adjusted to accommodate the spatial dimensions of various containers or different irrigation or growing systems. In other embodiments, the first NFT irrigation system 120A and the Ebb and Flow irrigation system 110 may each have their own individual, separate reservoirs. As shown in FIGS. 3 and 8, in an embodiment, the reservoir 124 of the second NFT irrigation system 120B may be disposed subjacent to the lowermost row of and have a length approximately equal to the length of the rack 121B of the second NFT irrigation system 120B, though the reservoir 124 may be alternatively arranged or positioned without departing from the inventive subject matter disclosed herein.

Figure 11:
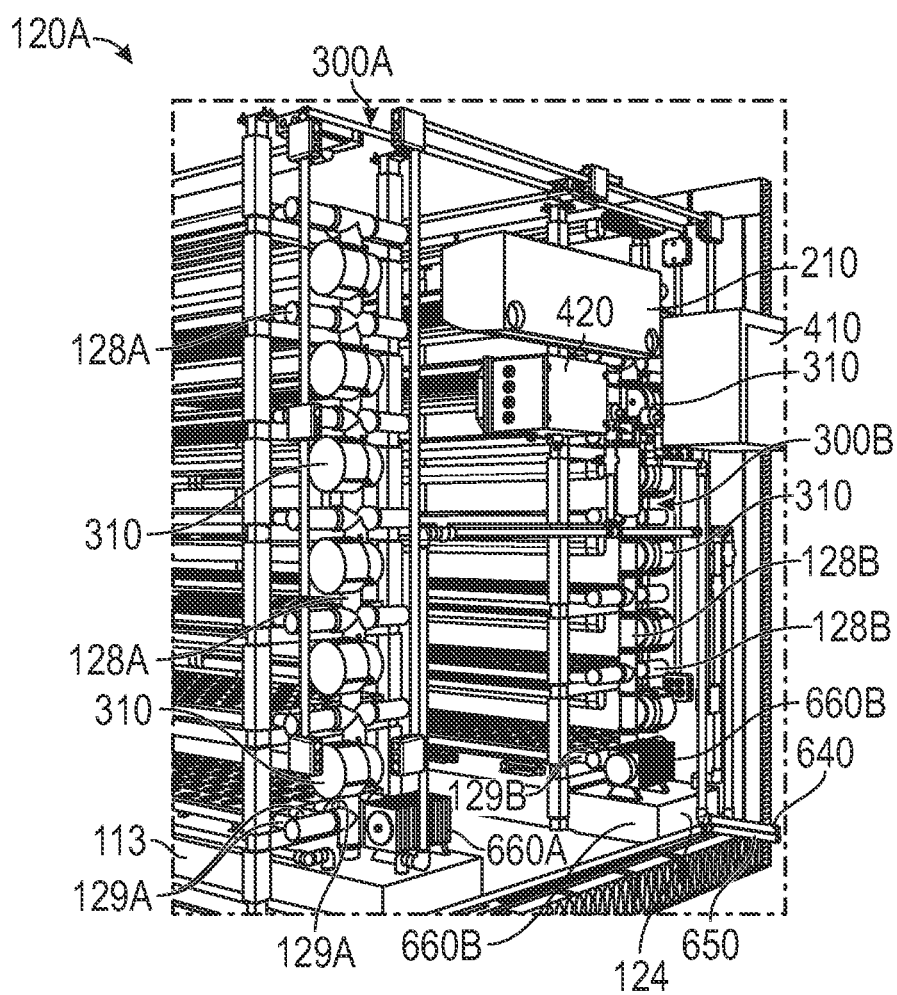
FIG. 11 shows a partial perspective view of the interior of a growing system having features consistent with the principles of the present disclosure.

As shown in FIG. 11, the growing system 10 may further include one or more aerators 660A, 660B configured to introduce air into nutrient solution within the reservoirs 113, 124. As best shown in FIG. 11, in an embodiment, the growing system 10 may include a first aerator 660A operably connected to the reservoir 113 of the Ebb and Flow irrigation system 110 and/or the first NFT irrigation system 120A and a second aerator 660B operably connected to the reservoir 124 of the second NFT irrigation system 120B. In an embodiment, the first and second aerators 660A, 660B may each be operably connected to the reservoir 113 of the Ebb and Flow irrigation system 110 and/or the first NFT irrigation system 120A and the reservoir 124 of the second NFT irrigation system 120B, respectively, via one or more aeration lines extending from the interior of the reservoirs 113, 124 to the first and second aerators 660A, 660B.

Like the input conduit 115 of the Ebb and Flow irrigation system 110, the respective input conduits 126A, 126B of the first and second NFT irrigation systems 120A, 120B extend from the respective reservoirs 113, 124 and serve as a conduit through which nutrient solution may be directed from the respective reservoirs 113, 124 to the channels 122A, 122B within first and second NFT irrigation systems 120A, 120B. In an embodiment, the nutrient supply pump 125A of the first NFT irrigation system 120A may be fluidly connected to the reservoir 113 of the first NFT irrigation system 120A and/or the Ebb and Flow irrigation system 110 via input conduit 126A. In an embodiment, the nutrient supply pump 125B of the second NFT irrigation system 120B may be fluidly connected to reservoir 124 of the second NFT irrigation system 120B. The nutrient supply pump 125A, 125B of the first and second NFT irrigation systems 120A, 120B are configured to pump nutrient solution from the reservoir 113, 124 to which it is fluidly connected through input conduits 126A, 126B to the channels 122A, 122B within the first and second NFT irrigation systems 120A, 120B. As shown in FIGS. 5-6 and 8-10, the input conduits 126A, 126B of the first and second NFT irrigation systems 120A, 120B may have one or more arm assemblies 127A, 127B through which nutrient solution pumped through the input conduits 126A, 126B pass prior to reaching the channels 122A, 122B. In some embodiments, the number of arm assemblies 127A, 127B within a NFT irrigation system 120A, 120B may be equal to the number of rows within the racks 121A, 121B. As shown best in FIG. 10, each arm assembly 127A, 127B of the first and second NFT irrigation systems 120A, 120B may each comprise an arm member 127B (i), a shutoff valve 127B (ii), and one or more output lines 127B (iii) extending from the arm member 127B (i). The arm member 127B (i), shutoff valve 127B (ii), and output lines 127B (iii), may be arranged in the same manner and have the same functionalities as the arm members 116A, shutoff valves 116B, and output lines 116C of the arm assemblies 116 within the Ebb and Flow irrigation system 110.

The output conduits 128A, 128B of the first and second NFT irrigation systems 120A, 120B are fluidly connected to the respective reservoirs 113, 124 of each NFT irrigation system 120A, 120B. The output conduits 128A, 128B are configured to permit nutrient solution to drain back to the reservoirs 113, 124 of the respective irrigation systems 120A, 120B for recirculation once reaching a defined point within the channels 122A, 122B. As shown in FIGS. 6 and 8, in an embodiment, the input conduits 126A, 126B and corresponding arm assemblies 127A, 127B may be disposed on a first end of the racks 121A, 121B of the first and second NFT irrigation systems 120A, 120B while the output conduit 128A, 128B of each system may be disposed on an opposite, second end of the racks 121A, 121B. In such embodiments, the output conduits 128A, 128B may be fluidly connected to the end of the channels 122A, 122B downstream from the input conduits 126A, 126B and located at the second end of the racks 121A, 121B. To facilitate transfer of nutrient solution to the output conduits 128A, 128B, each channel 122A, 122B may have an output line 129A, 129B that fluidly interconnects the channels 122A, 122B to the output conduits 128A, 128B, as shown best in FIGS. 11 and 13. In some embodiments, the respective output lines of an irrigation system may be integrally formed with the irrigation systems output conduit. Alternatively, the respective output lines and output conduit of an irrigation system may be individual, separate components that are fluidly connected.

The input conduits 115, 126A, 126B, arm members 116A, 127B (i), and the output conduits 117, 128A, 128B of the Ebb and Flow irrigation system 110 and first and second NFT irrigation systems 120A, 120B may each be constructed of a plurality of pipes and fittings. As such, the input conduits 115, 126A, 126B, arm members 116A, 127B (i), and/or the output conduits 117, 128A, 128B may be modular conduits in some embodiments. To reduce the cost and difficulty of both the initial construction and subsequent repair, the pipes and fittings used for construction of the above-described conduits, arm members, and output conduits may be polyvinyl chloride (PVC) pipes and fittings of standard size and dimension. However, one of skill in the art will readily appreciate that any pipping or fittings suitable for constructing the input conduits 115, 126A, 126B, arm members 116A, 127B (i), and the output conduits 117, 128A, 128B described herein may be utilized without departing from the inventive subject matter of the present disclosure. For instance, in some embodiments, metal piping and fittings may be used to construct the input conduits 115, 126A, 126B, arm members 116A, 127B (i), and the output conduits 117, 128A, 128B.

To provide sufficient light to plants disposed within the first and second NFT irrigation systems 120A, 120B, the first and second NFT irrigation systems 120A, 120B may each include a plurality of grow lights 119. A plurality of grow lights 119 may be used within each row of the first and second NFT irrigation systems 120A, 120B in some embodiments. For instance, as shown in FIGS. 6 and 8, in some embodiments, each row within the first and second NFT irrigation systems 120A, 120B may have a total of eight grow lights 119 disposed therein. In an embodiment, the grow lights 119 within each row may be linked together in series fashion. In such embodiments, each row within the first and second NFT irrigation systems 120A, 120B may have a single row of daisy-chained grow lights 119 extending from its first end to its second end, as shown best in FIG. 15. However, it is understood that the number and configuration of grow lights 119 within each of the first and second NFT irrigation systems 120A, 120B may vary depending on the length of the rows contained therein. The grow lights 119 utilized within the first and second NFT irrigation systems 120A, 120B may have some or all of the characteristics of the grow lights 119 described above for the Ebb and Flow irrigation system 110. Each grow light 119 within the first and second NFT irrigation systems 120A, 120B is disposed above one or more channels 122A, 122B within the respective NFT irrigation systems 120A, 120B. In some embodiments, each grow light 119 within the first and second NFT irrigation systems 120A, 120B may be secured approximately eight inches from one or more channels 122A, 122B. In such embodiments, the beam angle of each grow light 119 may be such that each grow light 119 outputs a beam of light approximately one to two feet in width onto the plants disposed within the channels 122A, 122B disposed therebelow. However, one of skill in the art will readily appreciate that the height at which the grow lights 119 are secured above the channels 122A, 122B and the beam angle of the grow lights 119 within the first and second irrigation systems 120A, 120B may vary and still fall within the scope of the present disclosure.

In some embodiments, each row within the first and second NFT irrigation systems 120A, 120B may support up to four channels 122A, 122B, though the number of channels 122A, 122B supported within each row may vary depending on the rack 121A, 121B design of each NFT irrigation system 120A, 120B, the type and size of the channels 122A, 122B used, and/or the crop being grown within the NFT irrigation system 120A, 120B. In some instances, the racks 121A, 121B and/or channels 122A, 122B utilized within the first and/or second NFT irrigation systems 120A, 120B may be adapted to foster the growth of microgreens. In such embodiments, the channels 122A, 122B utilized within the first and/or second NFT irrigation systems 120A, 120B may be wider than those shown within the drawings. Accordingly, when the first and second NFT irrigation systems 120A, 120B are adapted for microgreen production each row within the racks 121A, 121B may support less than four channels 122A, 122B. Moreover, when adapted for microgreen production, the channels 122A, 122B may have a mesh mat contained therein on which plant seeds may grow. In such embodiments, the channels 122A, 122B may be devoid of channel covers 123A, 123B.

In other embodiments, the first and/or second NFT irrigation systems 120A, 120B may be adapted to foster the growth of vine-based plants. In such embodiments, the channels 122A, 122B may be the same channels utilized for microgreen production but equipped with channel covers 123A, 123B. The diameter of each opening within the channel covers 123A, 123B may be such that multiple vine-based plants can grow and extend therethrough. To accommodate the growth of vine-based plants, each row of the first and/or second NFT irrigation system 120A, 120B may be removed from the racks 121A, 121B except for the bottom row. As such, the racks 121A, 121B of the first and second NFT irrigation systems 120A, 120B may be modular racks. To further accommodate and support vine-based plants, the first and/or second NFT irrigation systems 120A, 120B may each further include a wired structure (not shown). In some instances, the wired structure may be transitionable from a first, wound position to a second, unwound position. In another embodiment, the first and/or second NFT irrigation systems 120A, 120B may be adapted to foster the growth of *cannabis*. In such embodiments, the first and second NFT irrigation systems 120A, 120B may be arranged in the same manner as for vine-based plant production. To further promote *cannabis* growth, the first and second NFT irrigation systems 120A, 120B may each further include one or more aeropots (not shown). Each aeropot may be configured to be placed over an opening within a channel cover 123A, 123B.

As shown in FIG. 2, in an embodiment, the growing system 10 may further include an energy capture system 300 which utilizes the kinetic energy of nutrient solution flowing from one or more of the irrigation systems 110, 120A, 120B within the plant production system 100 to generate electrical energy for use within the growing system 10. The energy capture system 300 is defined by one or more energy capture subsystems 300A, 300B, where each energy capture subsystem 300A, 300B includes one or more energy capture devices 310 adapted to be fluidly connected to an irrigation system within the plant production system 100. In an embodiment, an energy capture subsystem is integrated into at least one of the Ebb and Flow irrigation system 110, the first NFT irrigation system 210A, and the second NFT irrigation system 210B.

FIGS. 12A-12D show various views of an energy capture device 310 in accordance with one embodiment of the present disclosure. As shown in FIGS. 12A-12D, each energy capture device 310 within an energy capture subsystem 300A, 300B includes a housing 312, an alternator 316 having a rotatable crankshaft 317, and a water wheel 314 operably secured to the crankshaft 317. As used herein, the term "alternator" and grammatical equivalents thereof are understood to mean any generator or other device adapted to receive rotational motion and to generate electrical energy in response to the application of such rotational motion. A portion of the housing 312 of each energy capture device 310 shown in FIGS. 12A, 12D, and 14, has been removed to better illustrate the positioning of certain components within each energy capture device's 310 housing 312 in accordance with an embodiment of the present disclosure. In some embodiments, the portion of the housing 312 removed within the figures may be enclosed by a window, such as a plexiglass window as shown in FIG. 13, so that operation of certain components within the interior of the energy capture device 310 may be viewed through the housing 312. Alternatively, the portion of the housing removed 312 within the figures may be enclosed by wall.

Figure 12A:
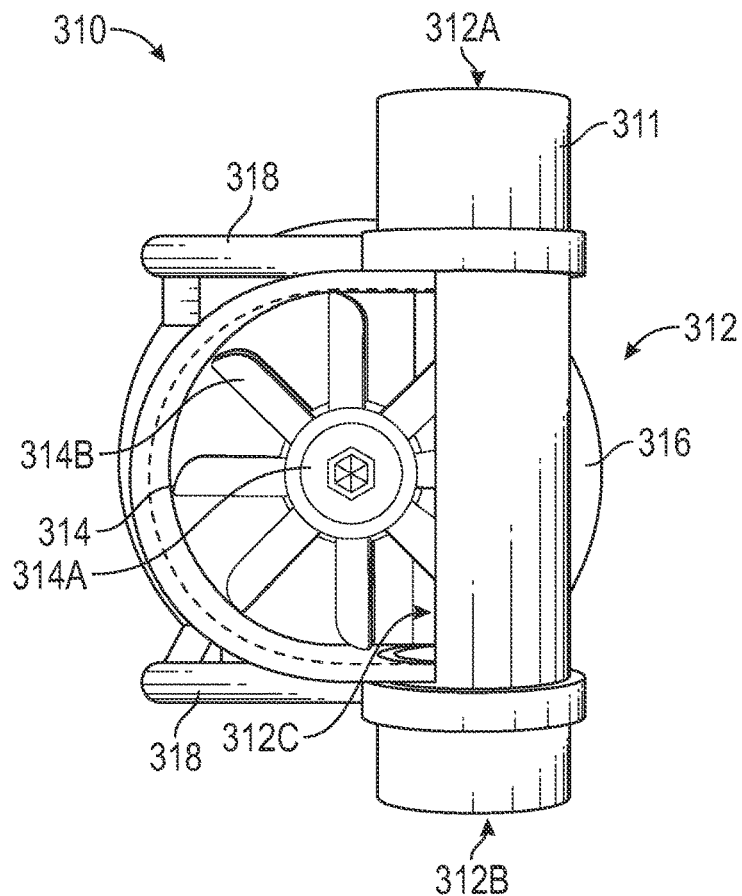
FIG. 12A shows a side view of an energy capture device having features consistent with the principles of the present disclosure.
Figure 12B:
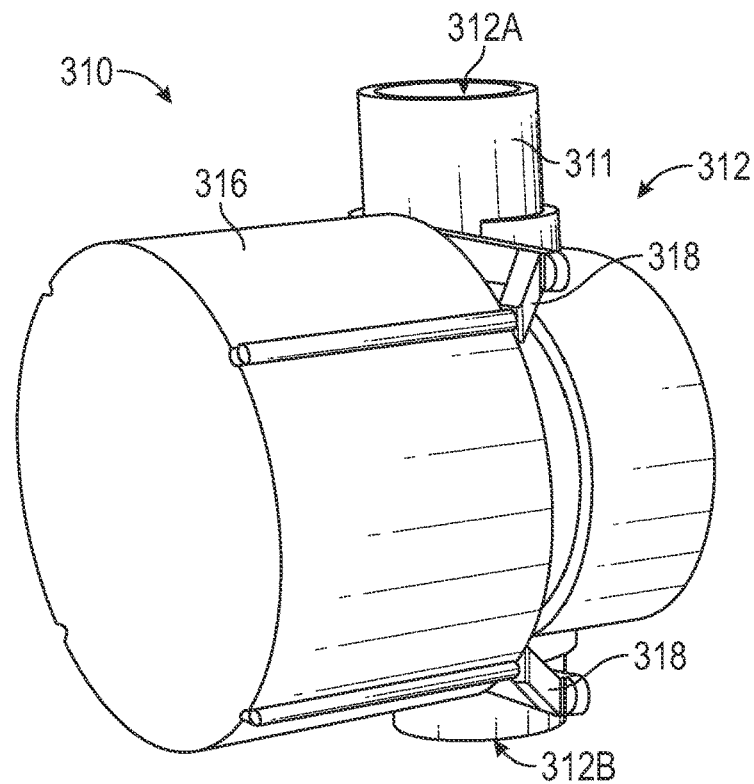
FIG. 12B shows a back perspective view of an energy capture device having features consistent with the principles of the present disclosure.
Figure 12C:
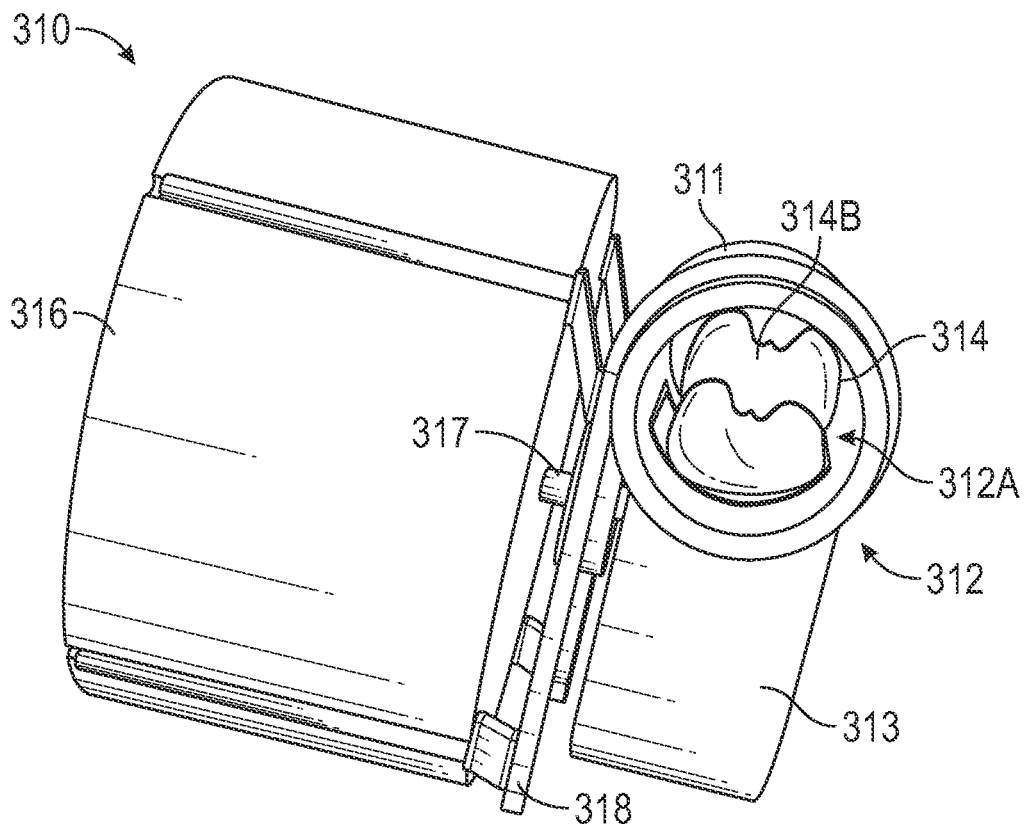
FIG. 12C shows a top view of an energy capture device having features consistent with the principles of the present disclosure.
Figure 12D:
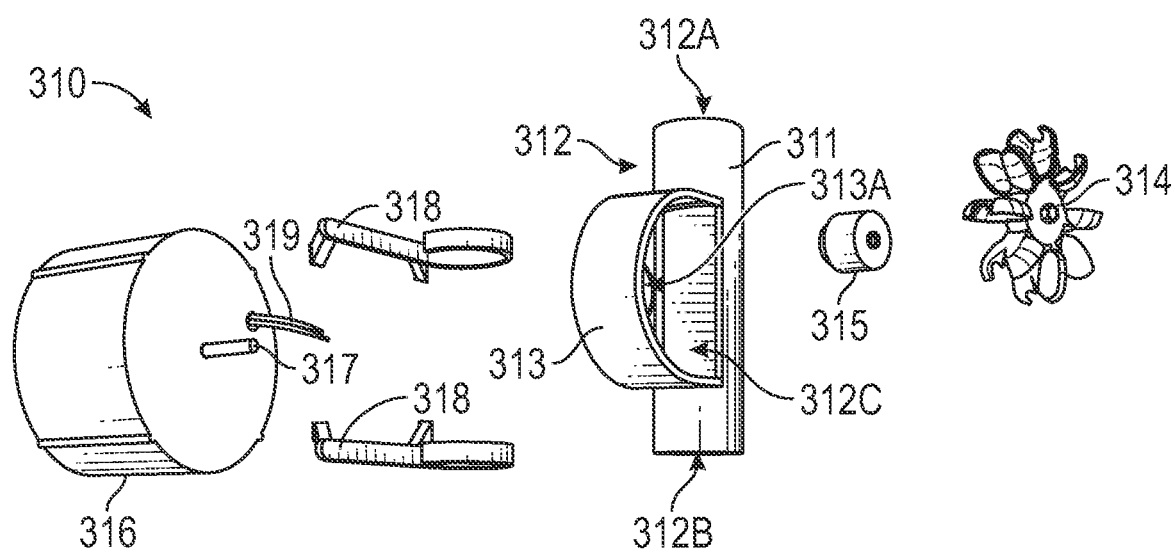
FIG. 12D shows an exploded view of an energy capture device having features consistent with the principles of the present disclosure.
Figure 13:
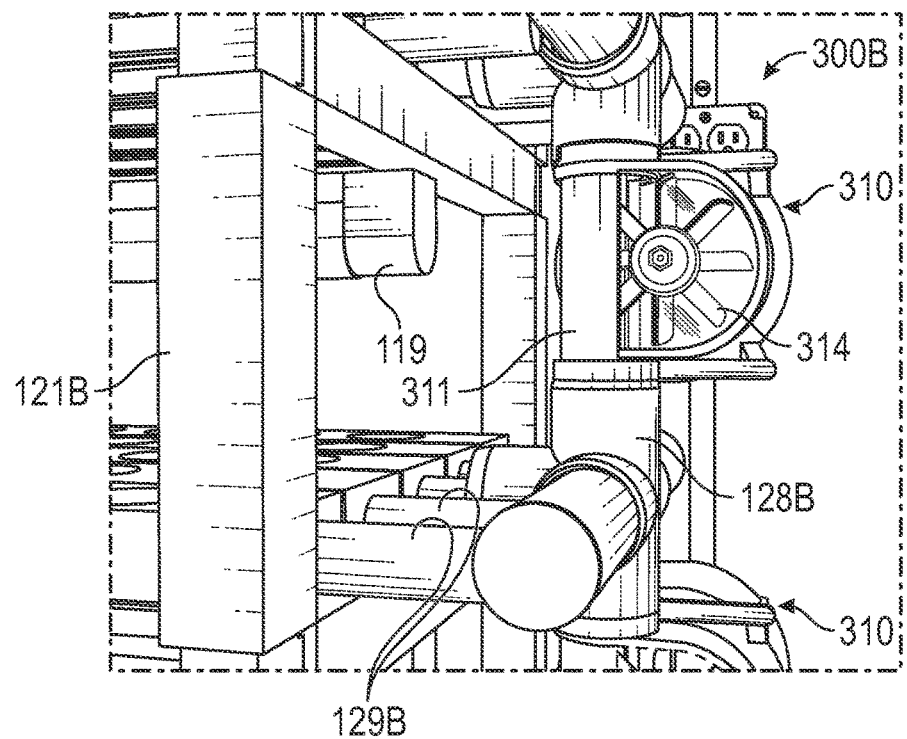
FIG. 13 shows a partial perspective view of an irrigation system and energy capture system having features consistent with the principles of the present disclosure.

As shown in FIGS. 12A-12D, the housing 312 of each energy capture device 310 may include an elongated conduit 311 defining a flow direction in which liquid may pass through the interior of the energy capture device 310. The conduit 311 of the housing 312 is adapted to be fluidly connected to the output conduit 117, 128A, 128B, of an irrigation system within the plant production system, as shown best in FIG. 11. In an embodiment, the conduit 311 of the housing 312 includes an inlet 312A, an outlet 312B disposed opposite the inlet 312A, and a sidewall opening 312C disposed between the inlet 312A and the outlet 312B. As shown in FIG. 12D, in some embodiments, the housing 312 may further include a casing 313 that is adapted to at least partially house the water wheel 314 of the energy capture device 310 therein and which covers the sidewall opening 312C within the housing's 312 conduit 311. In some embodiments, the housing 312 may be further adapted to house the alternator 316.

As shown in FIG. 12A, the water wheel 314 may be defined by a central hub 314A and a plurality of blades 314B radially extending from the hub 314A. The hub 314A may include a central opening of sufficient diameter to permit passage of the crankshaft 317. Each blade of the plurality of blades 314B may, in some embodiments, retain a generally cup-like shape similar to or the same as that of a pelton wheel in order to better capture liquid flowing towards the water wheel 314, as shown best in FIGS. 12C and 12D. In other embodiments, the blades 314B of the water wheel may be alternatively shaped to retain other blade or bucket designs or configurations. For instance, in some embodiments, the blades 314B of the water wheel 314 may be shaped and designed in a manner consistent with the blades or buckets of vertical axis water wheels, stream water wheels, undershot water wheels, breastshot water wheels, backshot waterwheels, overshot waterwheels, or combinations thereof. The hub 314A of the water wheel 314 is operably connected to the crankshaft 317 of the alternator 316 in a manner such that the water wheel 314 can rotate in response liquid striking its blades 314B and drive rotation of the crankshaft 317.

In some embodiments, the alternator 316 may be oriented relative to the housing 312 such that the crankshaft 317 extends in a direction substantially perpendicular to the flow direction defined by the housing's 312 conduit 311, as best shown in FIGS. 12A and 12D. In embodiments where the housing 312 includes a casing 313, the casing 313 may include a casing opening 313A through which the crankshaft 317 of the alternator 316 extends into the housing's 312 interior. To maintain a set distance between the waterwheel 314 and a wall of the housing 312 and/or the body of the alternator 316, a spacer 315 may, in some embodiments, be placed on the crankshaft 317 prior to operably connecting the water wheel 314 to the crankshaft 317.

The water wheel 314 and crankshaft 317 are positioned relative to the conduit 311 of the housing 312 so that nutrient solution or other liquid flowing into the energy capture device's 310 inlet 312A contacts the blades 314B of the water wheel 314, thereby rotating the water wheel 314 and driving rotation of the crankshaft 317 causing the alternator 316 to generate electrical energy, prior to exiting through the outlet 312B. In an embodiment, the water wheel 314 and crankshaft 317 may be oriented relative to the conduit 311 of the housing 312 so that at least a portion of the water wheel 314 extends through the sidewall opening 312C into the interior of the conduit 311. In one embodiment, the crankshaft 317 and hub 314A of the water wheel 314 may be disposed outside of the conduit's 311 interior and the water wheel 314 may be oriented relative to the conduit 311 such that one or more of its blades 314B extends through the sidewall opening 312C and establishes a movable barrier between the conduit's 311 inlet 312A and outlet 312B, as best shown in FIGS. 12A and 12C. To hold the alternator 316 and crankshaft 317 in fixed relation to the housing 312, the energy capture device 310 may further include one or more brackets 318 having a first end adapted to secure to the housing 312 and a second end adapted to secure to the alternator 316. In one embodiment, the first end of the one or more brackets 318 may be adapted to secure to the conduit 311 of the housing 312. In some embodiments, each energy capture device 310 may include two brackets 318.

In some embodiments, the one or more energy capture subsystems 300A, 300B within the energy capture system 300 may each include a plurality of energy capture devices 310, as shown best in FIG. 11. In an embodiment, the plurality of energy capture devices 310 within an energy capture subsystem 300A, 300B may be vertically arranged such that each energy capture device 310 is vertically adjacent to at least one other energy capture device 310 within the subsystem, as further shown in FIG. 11. In some embodiments, the energy capture devices 310 within an energy capture subsystem 300A, 300B may be arranged such that the conduit 311 of each energy capture device 310 is linearly arranged with the conduits 311 of the other energy capture devices 310 within the subsystem, as shown best in FIGS. 11 and 13-14. In some embodiments, such linear arrangement of the energy capture devices' 310 conduits 311 may serve to reduce the distance nutrient solution must travel before entering successive energy capture devices 310 and the overall distance nutrient solution must travel through the subsystem 300A, 300B. In embodiments where an energy capture subsystem 300A, 300B includes a plurality of energy capture devices 310, each energy capture device 310 within the subsystem is fluidly connected to at least one other energy capture device 310 within the subsystem. The fluid connection existing between the energy capture devices 310 of a subsystem 300A, 300B facilitates passage of nutrient solution exiting from an energy capture device 310 to each energy capture device 310 disposed downstream of it, if any. In an embodiment, each energy capture device 310 within a subsystem 300A, 300B has at least one of its inlet 312A fluidly connected to the outlet 312B of an adjacent energy capture device 310 and its outlet 312B fluidly connected to the inlet 312A of an adjacent energy capture device 310, as best shown in FIGS. 11 and 13. For instance, in some embodiments, the uppermost energy capture device 310 within a subsystem 300A, 300B may have its outlet 312B fluidly connected to the inlet 312A of a downstream energy capture device 310, the lowermost energy capture device 310 within the subsystem may have its inlet 312A fluidly connected to the outlet 312B of an upstream energy capture device 310, and the energy capture devices 310 disposed between the uppermost and lowermost energy capture device 310 may each have their inlet 312A fluidly connected to an upstream energy capture device 310 and their outlet 312B fluidly connected to a downstream energy capture device 310. In some embodiments, the energy capture devices 310 within an energy capture subsystem 300A, 300B may be fluidly connected by the output conduit 117, 128A, 128B of an irrigation system 110, 120A, 120B within the plant production system. In other embodiments, the energy capture devices 310 within a subsystem 300A, 300B may be directly connected such that each energy capture device 310 within a subsystem has at least one of its inlet 312A secured to the outlet 312B of an adjacent energy capture device 310 and its outlet 312B secured to the inlet 312A of an adjacent energy capture device 310.

The number of energy capture devices 310 within an energy capture subsystem 300A, 300B may vary depending on, amongst other things, the design of the irrigation system 110, 120A, 120B in which the energy capture subsystem is to be incorporated, spatial constraints within the container 50, the type of alternator 316 utilized within each energy capture device 310, and/or the amount of electrical energy each energy capture subsystem 300A, 300B is desired to produce.

Figure 19:
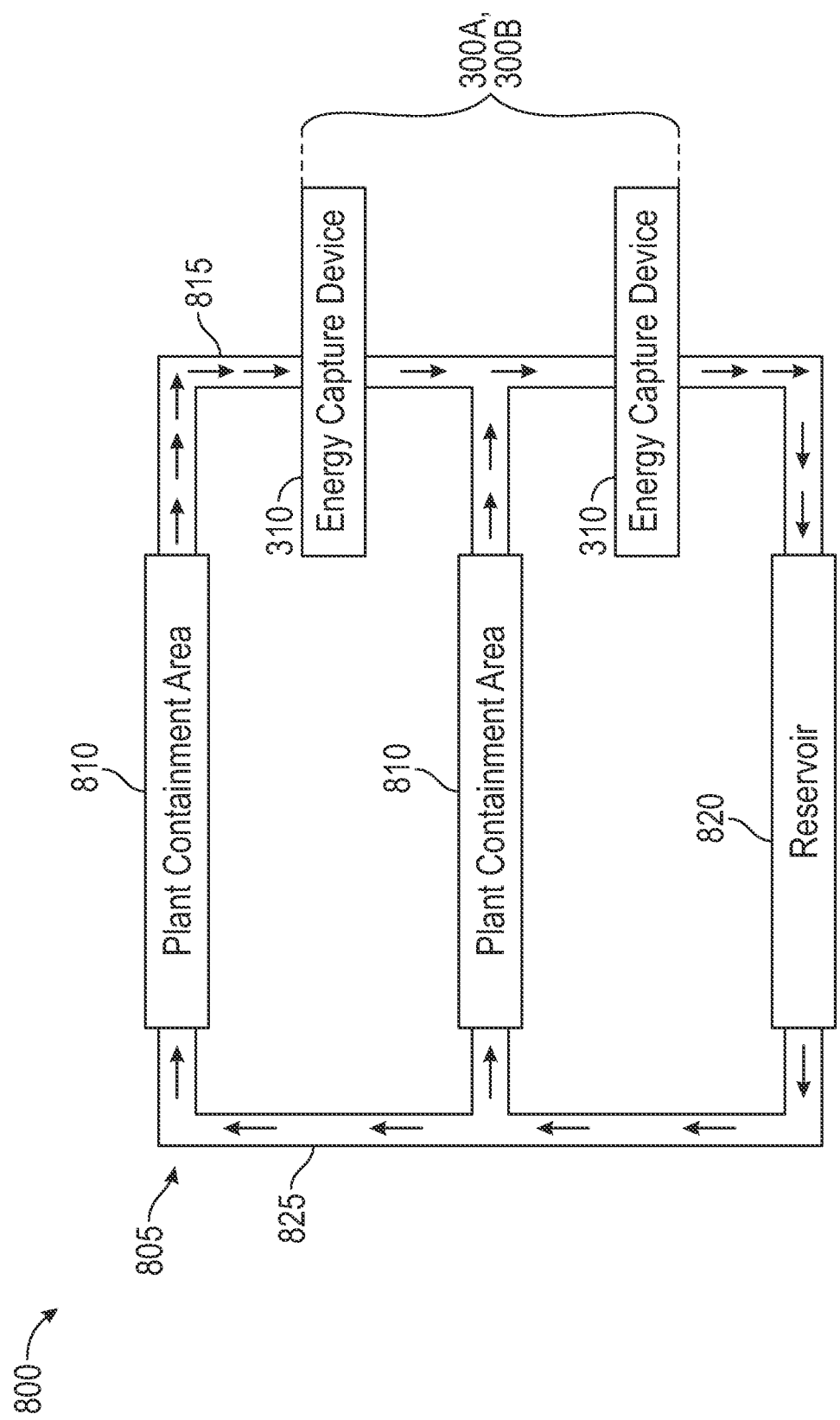
FIG. 19 is a diagram showing a system for generating electrical energy having features consistent with the principles of the present disclosure.

As shown in FIG. 19, the one or more energy capture subsystems 300A, 300B of the energy capture system 300, may be combined with one or more irrigation systems 110, 210A, 210B within the plant production system 100 to provide a system for generating electrical energy 800. In an embodiment, the system for generating electrical energy 800 includes at least one energy capture subsystem 300A, 300B fluidly connected to a hydroponic irrigation system 805 having one or more plant containment areas 810 for holding a plurality of plants and a reservoir 820 for holding nutrient solution, as further shown in FIG. 19. The hydroponic irrigation system may be an Ebb and Flow irrigation system 110, an NFT irrigation system 120A, 120B, or other irrigation system which fosters plant growth using hydroponics. Depending on the type of hydroponic irrigation system 805 used, each plant containment area 810 within the system 800 may be defined by one or more flood trays 112, one or more channels 122A, 122B, or one or more other containers suitable for holding plants therein and directing nutrient solution therethrough. The reservoir 820 of the system 800 may comprise the reservoir 113 of the Ebb and Flow irrigation system 110 and/or the first NFT irrigation system 120A or the reservoir 124 of the second NFT irrigation system 120B in some embodiments. To transfer nutrient solution from the hydroponic irrigation system's 805 reservoir 820 to its one or more plant containment areas 810, the hydroponic irrigation system 805 may further include input conduit 825 configured to fluidly interconnect the two. In some embodiments, hydroponic irrigation system's 805 input conduit 825 may comprise the input conduit 115 of the Ebb and Flow irrigation system 110, the input conduit 126A of the first NFT irrigation system 120A, or the input conduit 126B of the second NFT irrigation system 120B.

Each energy capture device 310 within the one or more energy capture subsystems 300A, 300B within the system 800 is fluidly connected to and disposed downstream of at least one plant containment area 810 of the hydroponic irrigation system 805. In an embodiment, each energy capture device 310 within the system's 800 one or more energy capture subsystems 300A, 300B may be fluidly connected to the output conduit 815 of the irrigation system 805. In some embodiments, the output conduit may comprise the output conduit 117 of an Ebb and Flow irrigation system 110 or the output conduit 128A, 128B of the first or second NFT irrigation systems 120A, 120B. As shown in FIG. 19, in some embodiments, each energy capture device 310 may be disposed downstream of at least one plant containment area 810 and upstream of the irrigation system's 805 reservoir 820 such that nutrient solution exiting the system's 800 one or more energy capture subsystems 300A, 300B is directed into the irrigation system's 805 reservoir 820. As further shown in FIG. 19, in such embodiments, the one or more energy capture subsystems 300A, 300B, input conduit 825, one or more plant containment areas 810, output conduit 815, and reservoir 820 of the system 800 may define a fluid circuit through which nutrient may be circulated to and from plants disposed within the irrigation system's 805 one or more plant containment areas 810.

In an embodiment, each energy capture device 310 within the one or more energy capture subsystems 300A, 300B may be fluidly connected to the irrigation system 805 such that each energy capture device 310 receives the nutrient solution exited from each plant containment area 810 upstream of it. For instance, in the embodiment shown in FIG. 19, the system's 800 irrigation system 805 may include a first plant containment area 810 and a second plant containment area 810, wherein the second plant containment area is disposed at lower level than the first plant containment area, and a first energy capture device 310 disposed downstream of the first plant containment area and a second energy capture device 310 disposed downstream of both the first and second plant containment area. In such embodiments, the first energy capture device 310 receives the nutrient solution exited from the first plant containment area while the second energy capture device 310 receives the nutrient solution exited from both the first and second plant containment areas. In other embodiments, the one or more subsystems 300A, 300B within the system 800 may include more or less than two energy capture devices 310 and the irrigation system 805 may include more or less than two plant containment areas 810. For instance, in one embodiment, as shown in FIG. 11, each energy capture subsystem 300A, 300B within the system 800 may include six vertically arranged capture devices 310 and the irrigation system may include six plant containment areas 810. In one such embodiment, each energy capture device 310 may be fluidly connected to the system's 800 irrigation system so that the uppermost energy capture device 310 of each energy capture subsystem 300A, 300B is located downstream and receives nutrient solution exited from one plant containment area 810 while the lowermost energy capture device 310 of the subsystem receives nutrient solution exited from six plant containment areas 810. In some embodiments, the number of energy capture devices 310 within an energy capture system 300A, 300B may be equal to the number of plant containment areas within the system's 800 irrigation system 805.

As evidenced by the above embodiments, the volume of nutrient solution flowing into each respective energy capture device 310 of each energy capture subsystem 300A, 300B within the system 800 may, in some embodiments, increase as each energy capture subsystem 300A, 300B extends from its uppermost positioned energy capture device 310 to its lowermost positioned energy capture device 310. In turn, the wattage of electrical power outputted by the energy capture devices 310 of each energy capture subsystem 300A, 300B may increase as the energy capture subsystem 300A, 300B extends from its uppermost positioned energy capture device 310 to its lowermost positioned energy capture device 310. For instance, in an embodiment, the electrical energy outputted by the energy capture devices 310 within an energy capture subsystem 300A, 300B may range from approximately 5 to 35 watts. One of skill in the art will appreciate, however, that the electrical energy outputted by a given energy capture device 310 may be affected and adjusted by manipulating a number of variables including, but not limited to, the flow rate of nutrient solution entering into an energy capture device 310, vertical positioning of an energy capture device 310 within an energy capture subsystem 300A, 300B, the fall rate exhibited by nutrient solution before contacting the water wheel 314 of an energy capture device 310, the type of water wheel 314 used, and the type of alternator 316 used. In some embodiments, the energy capture devices 310 within an energy capture subsystem 300A, 300B may be fluidly connected to an irrigation system 805 such that nutrient solution exiting a plant containment area 810 falls approximately one foot before reaching downstream energy capture device 310. However, one of skill in the art will readily appreciate that the distance between each energy capture device 310 and the plant containment areas may be adjusted to affect the experienced fall rate of nutrient solution prior to contacting the water wheel 314 of an energy capture device 310.

In some embodiments, the system 800 may include a plurality of hydroponic irrigation systems 805 each having an energy capture subsystem fluidly connected thereto. In one embodiment, the system 800 may be defined by a first energy capture subsystem 300A integrated into a first NFT irrigation system 120A and a second energy capture subsystem 300B integrated into a second NFT irrigation system 120B, as shown best in FIGS. 11 and 14.

Electrical energy generated by the energy capture devices 310 of the one or more energy capture subsystems 300A, 300B may be used to power various components, instruments, or devices throughout the growing system 10. For instance, in an embodiment, the energy capture devices 310 of a first energy capture subsystem 300A may be used to provide electrical power to the a first aerator 660A and the energy capture devices 310 of a second energy capture subsystem 300B may be used to provide electrical power to a second aerator 660B. However, the electrical energy produced by the energy capture devices 310 within the energy capture subsystems 300A, 300B may be directed to other electrically powered components, devices, or instruments within the growing system 10 including, but not limited to, grow lights 119, an HVAC system 210, fans 220, a dehumidifier 230, a controller 420, nutrient solution supply pumps 114, 125A, 125B, outflow pumps 670, 680, dosage pumps 510, 520, and/or combinations thereof. The electrical power produced by each energy capture device 310 within an energy capture subsystem 300A, 300B may be directed to the same component, device, or instrument or to different components, devices, or instruments within the growing system 10. For instance, the electrical power produced by a first energy capture device 310 within an energy capture subsystem 300A, 300B may be directed to the first aerator 660A while the electrical power produced by a second energy capture device 310 within the same energy capture subsystem 300A, 300B may be directed to one or more grow lights 119 within the growing system 10.

The alternator 316 of each energy capture device 310 may be electrically connected to one or more components within the growing system 10 via one or more electrical wires 319 suitable for transmitting electrical current. In some embodiments, the alternator 316 of each energy capture device 310 may be configured to output alternating current in response to rotation of its crankshaft 317. In some embodiments, the growing system 10 may further include an alternating current to direct current converter, such as a three-phase converter, electrically connected between the alternator 316 and a designated component, instrument, or device within the growing system 10. Alternatively, the alternator 316 may be directly electrically connected to a designated component, instrument, or device of the growing system 10. In alternative embodiments, the alternator 316 may be configured to output direct current in response to rotation of the crankshaft 317.

The environmental regulation system 200 is configured to regulate the climate conditions and to measure certain environmental conditions within the container 50 to promote optimal plant growth within the irrigation systems disposed therein. To regulate climate conditions within the container, the environmental regulation system 200 may include an HVAC system 210, one or more fans 220, and a dehumidifier 230, as shown best in FIG. 4. The HVAC system 210 is configured to regulate the temperature within the interior of the container 50 by introducing conditioned air into the container's 50 interior. To direct conditioned air centrally from one end of the container's 50 to the other, in an embodiment, the HVAC system 210 may be centrally located on a back wall of the container 50 such that the output of the HVAC system 210 is, at least partially, facing an aisle between the first and second NFT irrigation systems 120A, 120B, as shown best in FIGS. 11 and 14. The one or more fans 220 of the environmental regulation system 200 are configured to circulate air throughout the interior of the container 50. As shown in FIG. 4, the environmental regulation system 200 may include two or more fans 220 spaced throughout the container's 50 interior. As further shown in FIG. 4, the one or more fans 220 may be secured to the ceiling wall of the container 50 in some embodiments. The dehumidifier 230 is configured to manage humidity within the interior of the container 50 by reducing humidity levels within the container's 50 interior. As shown in FIGS. 3-4, in some embodiments, the dehumidifier 230 may be disposed directly above the Ebb and Flow irrigation system 110 in order to reduce the space occupied by the dehumidifier 230 within the container 50.

Figure 15:
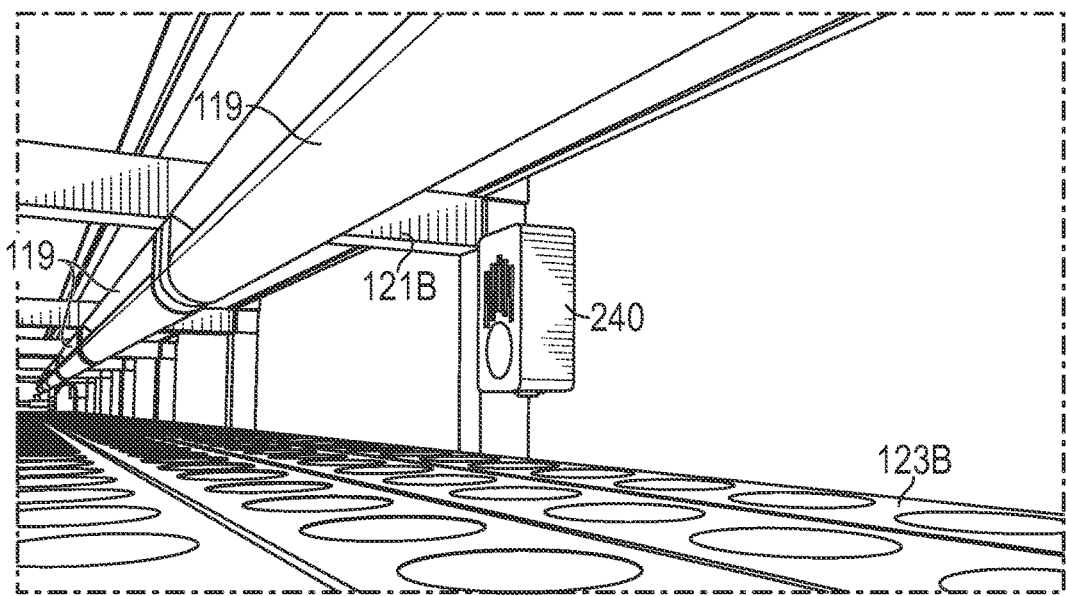
FIG. 15 shows a partial perspective view of a portion of the interior of a growing system having features consistent with the principles of the present disclosure.
Figure 16:
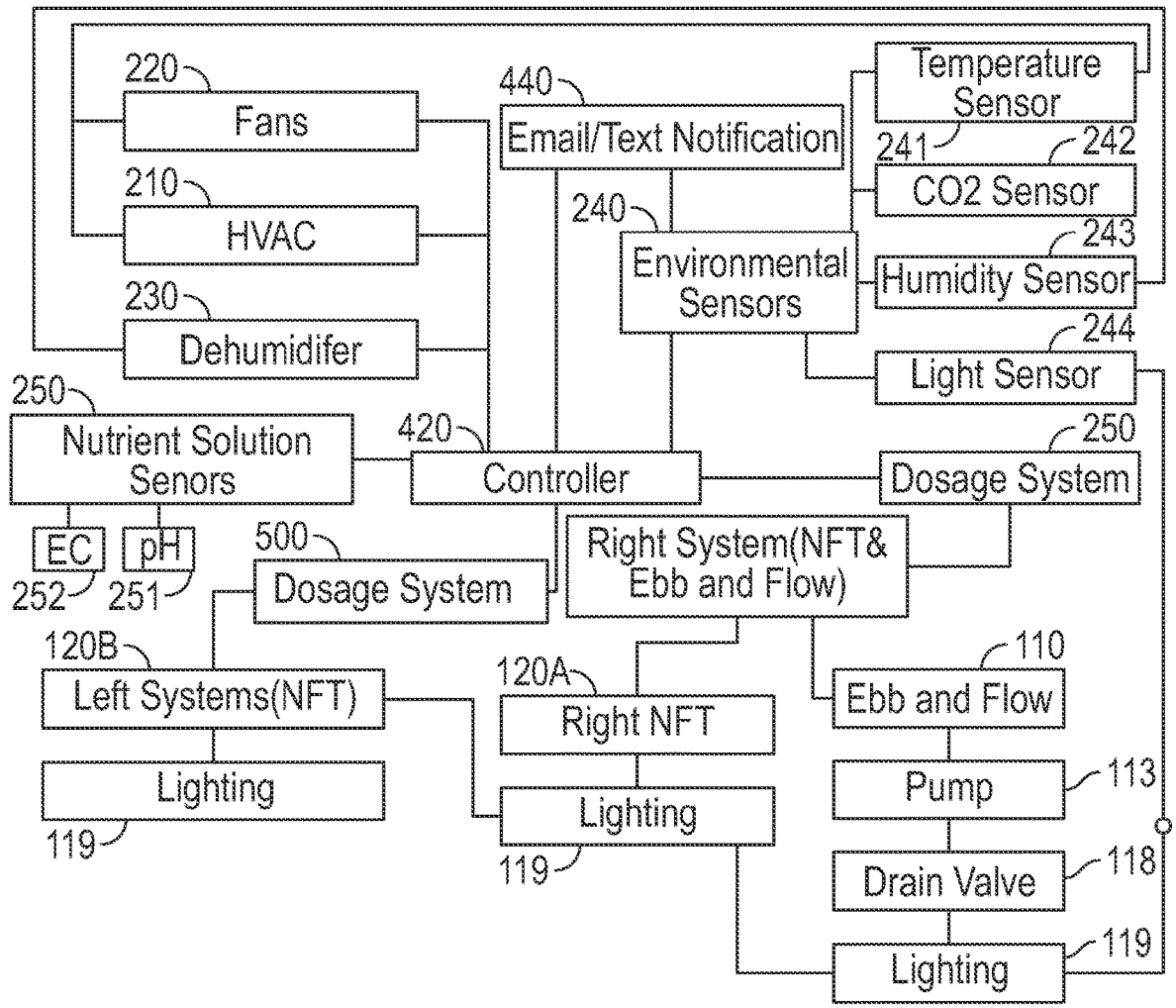
FIG. 16 is a block diagram showing certain components of a growing system having features consistent with the principles of the present disclosure.

To measure certain environmental conditions within the container 50 and experienced by the plant life contained therein, the environmental regulation system 200 may further include both environmental sensors 240 and nutrient solution sensors 250. In an embodiment, the environmental sensors 240 may be disposed within the container 50 in close proximity to the flood trays 112 and/or channels 122A, 122B in which plants within the growing system 10 may be disposed. FIG. 15 is meant to show a general representation of an environmental sensor 240 positioned in relation to a row of channels 123B within the second NFT irrigation system 120B. As shown in FIG. 16, the environmental sensors 240 may include a temperature sensor 241 configured to measure the temperature of the container's 50 interior, a carbon dioxide ($CO_2$) sensor 242 configured to measure the $CO_2$ levels within the container's 50 interior, a humidity sensor 243 configured to measure humidity within the container's 50, and a light sensor 244 configured to measure light levels within the container's 50 interior. Each of the environmental sensors 240 may be operably connected to a controller 420. In some instances, the environmental sensors 240 may additionally or alternatively be operably connected to one or more other components of the environmental regulation system 200. For instance, the temperature sensor 241 may be operably connected to the HVAC system 210 and the one or more fans 220 such that HVAC system 210 and/or the one or more fans carries out one or more pre-defined actions when the temperature sensor 241 detects the interior temperature of the container 50 has fallen below or exceed a defined temperature or range of temperatures. The humidity sensor 243 may be operably connected to the dehumidifier 230 such that the dehumidifier 230 carries out one or more pre-defined actions when the humidity sensor 243 detects the humidity level within the container's 50 interior has fallen below or exceeded a defined humidity level or range of humidity levels. The light sensor 244 may be operably connected to one or more of the grow lights 119 within the container 50 such that the one or more grow lights 119 carry out one or more pre-defined actions when the light levels within the container's 50 interior fall below or exceed a pre-defined level or range of levels.

Figure 18:
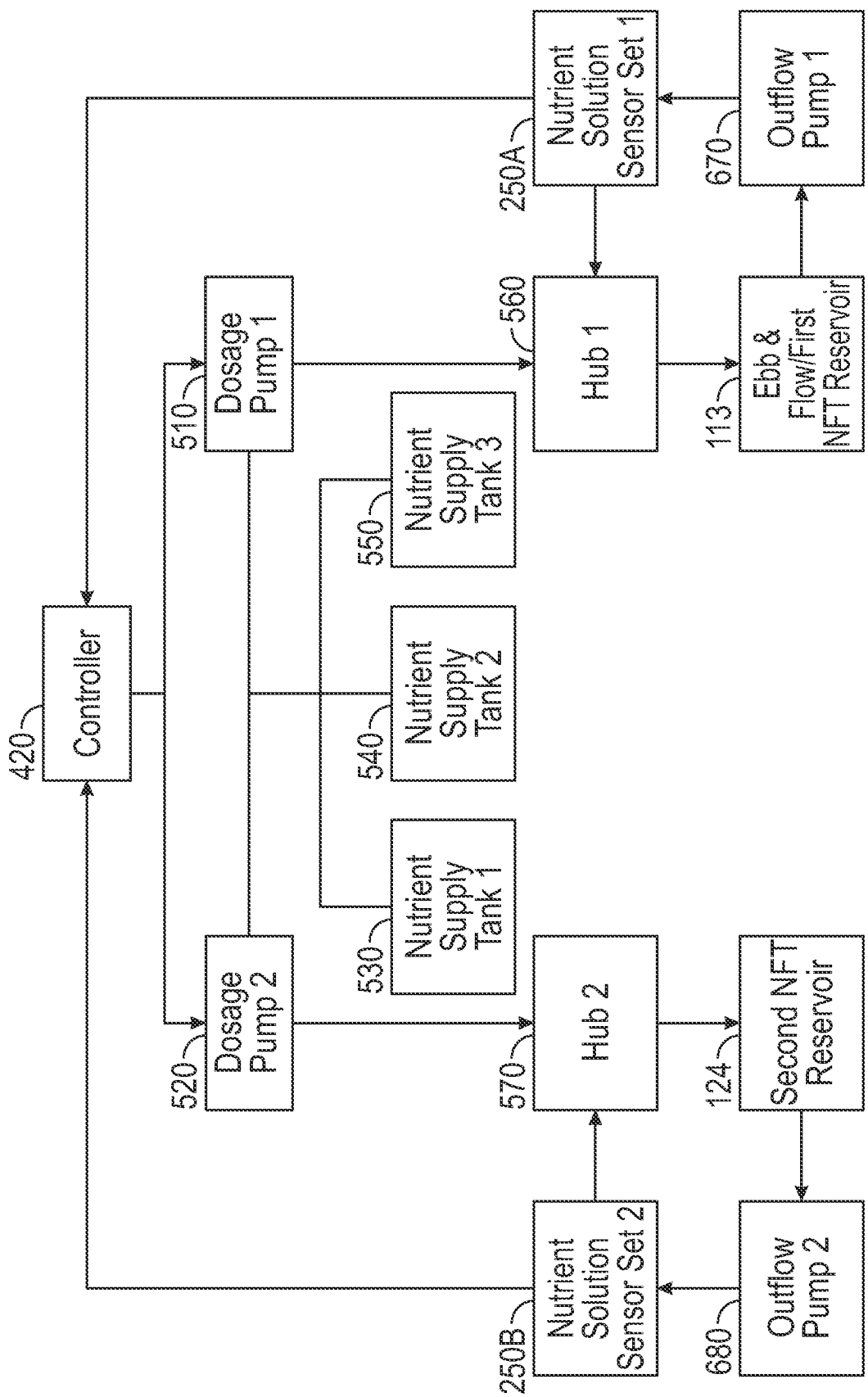
FIG. 18 is a block diagram showing certain features of a control system, dosage system, and plant production system of a growing system having features consistent with the principles of the present disclosure.

The nutrient solution sensors 250 may, in some embodiments, be defined by a first set of nutrient solution sensors 250A and a second set of nutrient solution sensors 250B, as shown in FIG. 18. In an embodiment, the first set of nutrient solution sensors 250A is configured to measure certain characteristics exhibited by nutrient solution contained within the reservoir 113 of the Ebb and Flow irrigation system 110 and/or the first NFT irrigation system 120A while the second set of nutrient solution sensors 250B is configured to measure certain characteristics of nutrient solution contained within the reservoir 124 of the second NFT irrigation system 120B. In an embodiment, the first and second set of nutrient solution sensors 250A, 250B may each comprise a pH sensor 251 configured to measure the acidity or basicity of nutrient solution and an electrical conductivity (EC) sensor 252 configured to measure the electrical conductivity of nutrient solution, as shown in FIG. 16. Each sensor of the first and second set of nutrient solution sensors 250A, 250B may be operably connected to a controller 420 in the manner described herein. Each sensor of the first and second set of nutrient solution sensors 250A, 250B may additionally or alternatively be operably connected to the dosage system 500 described herein.

The dosage system 500 is configured to supply nutrient solution to each irrigation system within the plant production system 100 and is operably connected to the same, as best shown in FIGS. 2 and 18. As shown best in FIGS. 5, 9, 14, and 18, the dosage system 500 may include a first dosage pump 510, a second dosage pump 520, and one or more nutrient supply tanks 530, 540, 550 containing plant nutrients and/or pH adjuster solution therein. In some embodiments, the dosage system 500 may include a first nutrient supply tank 530, a second nutrient supply tank 540, and a third nutrient supply tank 550. The first nutrient supply tank 530 may contain a solution of macronutrients, the second nutrient supply tank 540 may contain a solution of micronutrients, and the third nutrient supply tank 550 may contain solution that affects the pH of a nutrient solution. The solution contained within the third supply tank 550 may be an acidic or basic solution. In one embodiment, the first nutrient supply tank 530 may contain a calcium nitrate solution, the second nutrient supply tank 540 may contain a pre-blended lettuce formula, and the third nutrient supply tank 550 may contain a basic solution.

Figure 14:
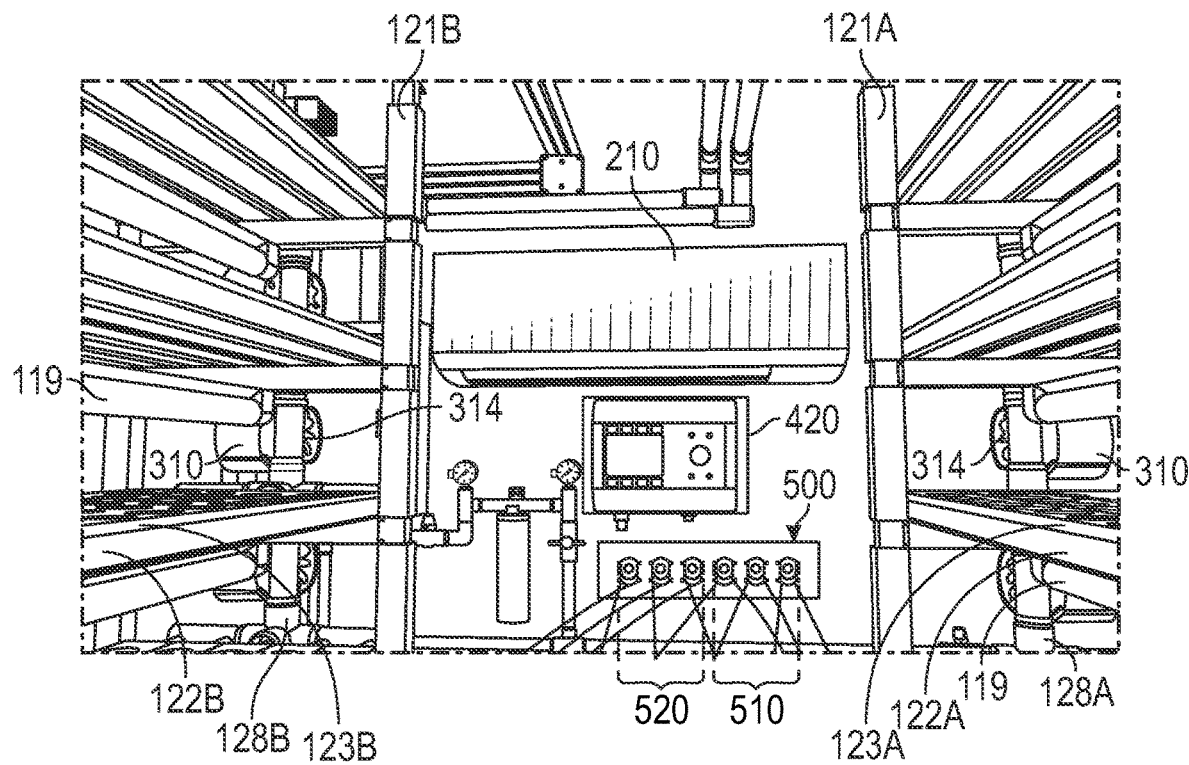
FIG. 14 shows a portion of the interior of a growing system having features consistent with the principles of the present disclosure.

In an embodiment, the first dosage pump 510 may be configured to draw solution from the first nutrient supply tank 530, the second nutrient supply tank 540, and/or the third nutrient supply tank 550 and direct the same into the reservoir 113 of the Ebb and Flow irrigation system 110 and/or the first NFT irrigation system 120A. In some embodiments, the second dosage pump 520 may be configured to draw solution from the first nutrient supply tank 530, the second nutrient supply tank 540, and/or the third nutrient supply tank 550 and direct the same into the reservoir 124 of the second NFT irrigation system 120B. As shown best in FIG. 14, in an embodiment, the first and second dosage pumps 510, 520 may each comprise one or more peristaltic pumps. In some embodiments, the number of peristaltic pumps within each of the first and second dosage pumps 510, 520 may be equal to the number of nutrient solution tanks 530, 540, 550 within the dosage system 500. Accordingly, in instances where the dosage system 500 has a first, second, and third nutrient supply tank 530, 540, 550, the first and second dosage pumps 510, 520 may each comprise three peristaltic pumps, as shown in FIG. 14. In such embodiments, each peristaltic pump may have an intake line extending from the peristaltic pump into a nutrient supply tank through which nutrient solution is drawn from the nutrient supply tank. Each peristaltic pump may also have an output line which, at least partially, fluidly connects the peristaltic pump to a reservoir of either the reservoir 113 of the Ebb and Flow irrigation system 110 and/or first NFT irrigation system 120A or the reservoir 124 of the second NFT irrigation system 120B such that nutrient solution drawn by the peristaltic pump may be subsequently delivered to the respective reservoirs via the output line.

In some embodiments, each peristaltic pump may be fluidly connected to a reservoir 113, 124 by fluidly connecting the output line of the peristaltic pump to the output conduit 128A, 128B of the first or second NFT irrigation system 120A, 120B. In one such embodiment, each peristaltic pump defining a dosage pump 510, 520 may be fluidly connected to a reservoir 113, 124 by fluidly connecting the output line of the peristaltic pump to a hub 560, 570 configured to receive the output line of each peristaltic pump defining a dosage pump and subsequently connecting the hub to either the output conduit 128A, 128B of the first or second NFT irrigation system 120A, 120B. For instance, the peristaltic pumps of the first dosage pump 510 may be fluidly connected to a first hub 560 which, in turn, is fluidly connected to the output conduit 128A of the reservoir 113 of the Ebb and Flow irrigation system 110 and/or first NFT irrigation system 120A. The peristaltic pumps of the second dosage pump 520 may be fluidly connected to a second hub 570 which, in turn, is fluidly connected to the reservoir 124 of the second NFT irrigation system 120B. In some embodiments, the first hub 560 and second hub 570 may be directly fluidly connected to the reservoirs 113, 124. In some embodiments, the first set of nutrient solution sensors 250A may be disposed within the first hub 560 and the second set of nutrient solution sensors 250B may be disposed within the second hub 570. Alternatively, the first set of nutrient solution sensors 250A may be disposed within the reservoir 113 of the Ebb and Flow irrigation system 110 and/or the first NFT irrigation system 120A and the second set of nutrient solution sensors 250B may be disposed within the reservoir 124 of the second NFT irrigation system 120B.

The control system 400 is configured to control certain actions and/or operations of certain components within the growing system 10. To this end, the control system 400 may be operably connected to at least one of the plant production system 100, the environmental regulation system 200, and the dosage system 500. The control system 400 may include a controller 420 which may be operably connected to one or more components of the plant production system 100, the environmental regulation system 200, and/or the dosage system 500. In an embodiment, the controller 420 includes a processor configured to receive input information such as signals from other devices or instructionary commands or instructions, process such input information, and perform certain operations and/or direct other devices within the growing system 10 operably connected to the controller 420 to carry out certain actions. The controller 420 may be equipped with a display and interface which users may engage with to: direct the controller 420 to immediately carry out certain actions; define optimal growing conditions, such as an optimal temperature or range of temperatures, optimal $CO_2$ level or range of $CO_2$ levels, optimal humidity level or range of humidity levels, optimal lighting conditions, optimal pH level or range of pH levels, or optimal EC level or range of EC levels for the controller 420 to subsequently reference; or pre-program the controller 420 to carry out certain actions at a pre-defined time or upon the occurrence of a certain event or action within the growing system 10. In this way, the controller 420 may provide for substantially autonomous regulation and operation of the various subsystem components operably connected thereto. In some embodiments, the controller 420 may be adapted to operably connect to the computing device of a user, such as a laptop computer, desktop computer, tablet, mobile phone, etc. via a wired or wireless connection such that information may be transmitted from a user's computing device to the controller 420 and vice versa. In such embodiments, users may utilize their computing device to: direct the controller 420 to immediately carry out certain actions; define optimal growing conditions, such as an optimal temperature or range of temperatures, optimal $CO_2$ level or range of $CO_2$ levels, optimal humidity level or range of humidity levels, optimal lighting conditions, optimal pH level or range of pH levels, or optimal EC level or range of EC levels for the controller 420 to reference; or pre-program the controller 420 to carry out certain actions at a pre-defined time or upon the occurrence of a certain event or action within the growing system 10. In this way, the controller 420 may provide for substantially autonomous regulation and operation of the various subsystem components operably connected thereto. In one embodiment, controller 420 may be operably connected to a user's computing device via a wireless connection, e.g., through a wireless network, and configured to transmit email and/or text notifications 440 to the user's computing device regarding environmental conditions, nutrient solution characteristics, or other informatics concerning the growing system 10.

The controller 420 may be operably connected to each sensor of the environmental sensors 240 and nutrient solution sensors 250 within the environmental regulation system 200, as shown best in FIG. 16. The controller 420 may be operably connected to the environmental sensors 240 and nutrient solution sensors 250 such that the readings and/or measurements taken by the temperature sensor 241, $CO_2$ sensor 242, humidity sensor 243, light sensor 244, pH sensors 251 within the first and second set of nutrient solution sensors 250A, 250B, and EC sensors 252 within the first and second set of nutrient solution sensors 250A, 250 are transmitted to the controller 420. The controller 420 may subsequently process the readings and/or measurements transmitted by the environmental sensors 240 and nutrient solution sensors 250 to determine whether the environmental conditions within the container 50 or nutrient solution being supplied to the plants within the irrigation systems of the plant production system 100 require adjustment to provide optimal growing conditions. When processing the information received from the environmental sensors 240 and nutrient solution sensors 250, the controller 420 may compare such information against growing conditions defined by a user to determine whether adjustments to the environmental conditions or nutrient solution is required. For instance, if a user defines an optimal growing temperature ranging from 70 degrees Fahrenheit to 78 degrees Fahrenheit and the temperature sensor 241 measures the temperature within the interior of the container 50 is 80 degrees Fahrenheit, the controller 420 may determine that the temperature within the container 50 needs to be reduced.

To regulate the environmental conditions within the container 50 and the characteristics of the nutrient solution supplied to the plants within the irrigation systems of the plant production system 100, the controller 420 may, in some embodiments, be operably connected to the HVAC system 210, the pump 114 of the Ebb and Flow irrigation system 110, the pump of the first NFT irrigation system 125A, the pump of the second NFT irrigation system 120B, the drain valve 118 of the Ebb and Flow irrigation system 110, the one or more fans 220, the dehumidifier 230, the grow lights 119, the non-grow lights 630 and the first and second dosage pumps 510, 520 of the dosage system 500, as best shown in FIGS. 16 and 18. The controller 420 may be operably connected to the above-listed components of the growing system 10 such that the controller 420 can direct the components to perform certain actions or operations by directing an electrical signal thereto. In this way, the controller 420 may provide for autonomous operation of some or all of the electrical components of the growing system 10. In some embodiments, the control system 400 may further include a relay box 430 interconnected between the controller 420 and one or more of the components operably connected thereto, as shown in FIGS. 3-5. The control system 400 may also include a breaker box 410 electrically interconnected between a power supply and one or more of the electrically powered components described herein, as shown best in FIG. 11.

Based on the information received from the environmental sensors 240 and subsequently processed by the controller 420, the controller 420 may direct the HVAC system 210, the one or more fans 220, the dehumidifier 230, and/or the grow lights 119 to perform certain actions. For instance, if the controller 420 determines that the temperature within the container 50 needs to be lowered based on the information transmitted by the temperature sensor 241, the controller 420 may direct the HVAC system 210 to output cool air into the container's 50 interior. Based on the information received from the first and second set of nutrient solution sensors 250A, 250B, the controller may, in some embodiments, direct the dosage system 500 to deliver solution from one or more of the nutrient solution supply tanks 530-550 to the reservoir 113 of the Ebb and Flow irrigation system 110 and/or the first NFT irrigation system 120A and/or to the reservoir 124 of the second NFT irrigation system 120B. For instance, if the controller 420 determines the nutrient solution within the reservoir 113 shared by the Ebb and Flow irrigation system 110 and the first NFT irrigation system 120A needs additional macronutrients and a reduction in its pH level based on the information transmitted from the first set of nutrient solution sensors 250A, the controller 420 may direct the first dosage pump 510 to draw solution from the first and third nutrient supply tanks 530, 550 and direct the same into the reservoir 113. Similarly, if the controller 420 determines the reservoir 124 of the second NFT irrigation system 120B needs additional micronutrients based on the information transmitted from the second set of nutrient solution sensors 250B, the controller 420 may direct the second dosage pump 520 to draw solution from the second nutrient supply tank 540 and direct the same into the reservoir 124.

In some embodiments, the growing system 10 may further include a first outflow pump 670 and a second outflow pump 680. The first outflow pump 670 may be fluidly connected to the reservoir 113 of the Ebb and Flow irrigation system 110 and/or the first NFT irrigation system 120A and configured to pump nutrient solution contained therein to the first set of nutrient solution sensors 250A. In some embodiments, the first outflow pump 670 may be fluidly interconnected between the reservoir 113 of the Ebb and Flow irrigation system 110 and/or the first NFT irrigation system 120A and a first hub 560 of the dosage system 500, as described herein. In such embodiments, the first set of nutrient solution sensors 250A may be disposed within or associated with the first hub 560. The second outflow pump 680 may be fluidly connected to the reservoir 124 of the second NFT irrigation system 120B and configured to pump nutrient solution contained therein to the second set of nutrient solution sensors 250B. In some embodiments, the second outflow pump 680 may be fluidly interconnected between the reservoir 124 of the second NFT irrigation system 120B and a second hub 570 of the dosage system 500. In such embodiments, the second set of nutrient solution sensors 250B may be disposed within or associated with the second hub 570. The first hub 560 may be further fluidly connected, either directly or indirectly, to the reservoir 113 of the Ebb and Flow irrigation system 110 and/or the first NFT irrigation system 120A such that nutrient solution pumped by the first outflow pump 670 is directed back into the reservoir 113 after passing through the first hub 560, as shown best in FIG. 18. The second hub 570 may be further fluidly connected, either directly or indirectly, to the reservoir 124 of the second NFT irrigation system 120B such that nutrient solution pumped by the second outflow pump 680 is directed back into the reservoir 124 after passing through the second hub 570, as best shown in FIG. 18.

In addition to the above, the growing system may further include a sink 610, a work table 620, one or more non-grow lights 630, a water input line 640, and a waste output line 650, as best shown in FIGS. 3-5, 9, and 11. To better illustrate certain components of the growing system 10 described herein, the dosage system 500 has been removed from view in FIG. 11. The water input line 640 may be coupled to an external water supply, such as a city water line, to draw water into the growing system 10. Water drawn into the growing system 10 by the input water line 640 may be utilized by one or more components within the growing system 10, such as the sink 610. The waste output line 650 may be coupled to depository for waste, such as a city sewer line, to direct waste out of the growing system 10.

Figure 17:
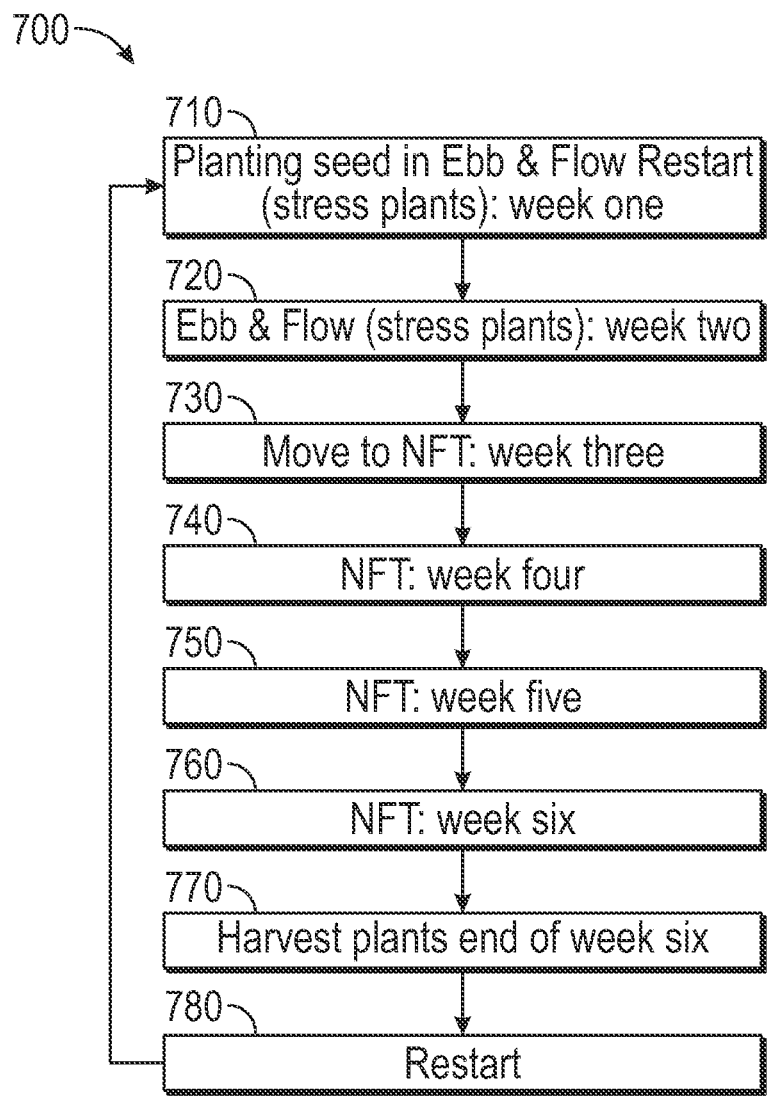
FIG. 17 is a flowchart showing certain method steps of a method for growing plants consistent with the principles of the present disclosure.

FIG. 17 shows a flow chart containing certain method steps of a method 700 for growing plants using the growing system 10 in accordance with one embodiment of the present disclosure. As shown within FIG. 17, the method 700 begins by planting a plurality of plant seeds and disposing the planted seeds within the Ebb and Flow irrigation system 110 in step 710. In step 710, during the first week within the Ebb and Flow irrigation system 110, the plants may be stressed to promote root growth by limiting the amount of nutrient solution supplied to the plants within the Ebb and Flow irrigation system 110 based on a prescribed watering schedule. Nutrient solution may be supplied to the plants in accordance with the prescribed watering schedule autonomously by the controller 420 by powering on and off and/or regulating the pumping action of the nutrient supply pump 114 and opening and closing the drain valve 118 of the Ebb and Flow irrigation system 110. In step 720, during the second week within the Ebb and Flow irrigation system 110, the plants may be further stressed in accordance with a prescribed watering schedule. The watering schedule utilized within in step 720 may be the same or different from the watering schedule utilized within step 710. After two weeks of being stressed within the Ebb and Flow irrigation system 110, the plants may be transitioned to the first and/or second NFT irrigation system 120A, 120B in step 730. Once transferred, the plants are left to grow within the first and/or second NFT irrigation system 120A, 120B for four weeks, as shown in steps 730-760. After four weeks within the first and/or second NFT irrigation systems 120A, 120B the plants may be harvested in step 770. After harvest, steps 710-770 may be repeated in step 780 to produce additional plants.

It is understood that versions of the inventive subject matter of the present disclosure may come in different forms and embodiments. Additionally, it is understood that one of skill in the art would appreciate these various forms and embodiments as falling within the scope of the inventive subject matter disclosed herein.

What is claimed is:

1. An irrigation system comprising:
   a plurality of plant containment areas each configured for holding plants, wherein the plurality of plant containment areas are arranged in a stacked configuration;
   a common output conduit configured to receive liquid from each of the plurality of plant containment areas through a plurality of discharge lines each connecting a respective one of the plurality of plant containment areas to the output conduit, wherein the output conduit is arranged in a generally vertical orientation that defines a generally vertical flow path through the output conduit; and
   a plurality of vertically aligned energy capture devices each fluidly connected to the output conduit of the irrigation system in an arrangement in which the generally vertical flow path extends through each of the plurality of energy capture devices, wherein the output conduit is configured to allow the liquid received into the output conduit from each of the plurality of containment areas to flow through at least one of the plurality of energy capture devices,
   wherein each energy capture device of the plurality of energy capture devices comprises:
      a housing including an elongated flow conduit defining a flow direction, wherein the flow conduit defines a portion of the output conduit, the flow conduit having an inlet, an outlet, and a sidewall opening disposed between the inlet and the outlet;
      an alternator having a rotatable crankshaft extending substantially perpendicular to the flow direction; and
      a water wheel operably secured to the crankshaft and extending through the sidewall opening into an interior of the flow conduit of the housing, the water wheel being adapted to rotate and drive rotation of the crankshaft in response to liquid flowing through the interior in the flow direction.

2. The irrigation system of claim 1, wherein the crankshaft of each respective energy capture device within the plurality of energy capture devices is disposed outside of the interior of the flow conduit of the energy capture device.

3. The irrigation system of claim 1, wherein the flow conduit of each respective energy capture device is linearly arranged with the flow conduits of the other energy capture devices within the plurality of energy capture devices.

4. The irrigation system of claim 1, wherein the plurality of energy capture devices includes a first energy capture device and a second energy capture device, wherein the outlet of the first energy capture device is fluidly connected to the inlet of the second energy capture device.

5. The irrigation system of claim 1, wherein each respective energy capture device has at least one of the inlet of the energy capture device fluidly connected to the outlet of an adjacent energy capture device and the outlet of the energy capture device fluidly connected to the inlet of an adjacent energy capture device.

6. The irrigation system of claim 1, wherein the housing of each respective energy capture device further includes a casing which covers the sidewall opening and in which the water wheel is housed, the crankshaft extending from the alternator into the casing via a casing opening.

7. The irrigation system of claim 1, wherein the alternator of each respective energy capture device is held in fixed relation to the housing via one or more brackets extending between the flow conduit and the alternator.

8. The irrigation system of claim 1, wherein the waterwheel of each respective energy capture device is defined by a hub and a plurality of blades radially extending from the hub.

9. The irrigation system of claim 8, wherein each blade of the plurality of blades has a cupped shape.

* * * * *